US008537922B2

(12) United States Patent
Wang et al.

(10) Patent No.: US 8,537,922 B2
(45) Date of Patent: Sep. 17, 2013

(54) METHODS AND SYSTEMS FOR PROVIDING FEEDBACK FOR BEAMFORMING AND POWER CONTROL

(75) Inventors: Xiaodong Wang, New York, NY (US);
Filippo Zuccardi Merli, Correggio (IT)

(73) Assignee: The Trustees of Columbia University in the City of New York, New York, NY (US)

( * ) Notice: Subject to any disclaimer, the term of this patent is extended or adjusted under 35 U.S.C. 154(b) by 517 days.

(21) Appl. No.: 12/665,684

(22) PCT Filed: Jun. 19, 2008

(86) PCT No.: PCT/US2008/067546
§ 371 (c)(1),
(2), (4) Date: Dec. 2, 2010

(87) PCT Pub. No.: WO2008/157724
PCT Pub. Date: Dec. 24, 2008

(65) Prior Publication Data
US 2011/0069774 A1 Mar. 24, 2011

Related U.S. Application Data

(60) Provisional application No. 60/936,340, filed on Jun. 19, 2007.

(51) Int. Cl.
*H04B 7/02* (2006.01)
(52) U.S. Cl.
USPC ........................................................ 375/267
(58) Field of Classification Search
USPC ................. 375/260, 267, 295, 316, 340, 342, 375/346; 455/68–69
See application file for complete search history.

(56) References Cited

U.S. PATENT DOCUMENTS

| 6,282,168 | B1 | 8/2001 | Vijayan et al. |
| 6,629,287 | B1 | 9/2003 | Brink |
| 6,745,009 | B2 | 6/2004 | Raghothaman |
| 6,747,945 | B2 * | 6/2004 | Sudo et al. ..................... 370/203 |
| 6,873,606 | B2 | 3/2005 | Agrawal et al. |
| 6,952,455 | B1 | 10/2005 | Banister |
| 7,006,804 | B1 | 2/2006 | Clark et al. |
| 7,027,533 | B2 | 4/2006 | Abe et al. |

(Continued)

OTHER PUBLICATIONS

International Patent Application No. PCT/US06/67546, filed Jun. 19, 2008.

(Continued)

*Primary Examiner* — Khanh C Tran
(74) *Attorney, Agent, or Firm* — Byrne Poh LLP

(57) ABSTRACT

Methods and systems for providing feedback for beamforming and power control are provided. In some embodiments, the methods comprise: calculating a threshold associated with a subcarrier; receiving the subcarrier containing an information symbol at the receiver; determining a channel estimate of the subcarrier and a weighting vector for the information symbol; based at least on the channel estimate and the weighting vector, determining a power level of the subcarrier; comparing the power level to the threshold; generating a feedback signal indicating a first energy level to be used for the subcarrier based on the comparison; subsequent to generating the feedback signal, determining a second power level of the subcarrier; comparing the second power level to the threshold; and generating a second feedback signal to the transmitter indicating a second energy level to be used for the subcarrier.

21 Claims, 9 Drawing Sheets

(56) References Cited

U.S. PATENT DOCUMENTS

| | | | |
|---|---|---|---|
| 7,076,263 | B2 | 7/2006 | Medvedev et al. |
| 7,180,956 | B1 | 2/2007 | Banister |
| 7,184,773 | B2 | 2/2007 | Nagai et al. |
| 7,212,838 | B2 | 5/2007 | Raghothaman |
| 7,221,956 | B2 | 5/2007 | Medvedev et al. |
| 7,224,758 | B1 | 5/2007 | Banister |
| 7,236,538 | B1 | 6/2007 | Banister |
| 7,236,546 | B2 | 6/2007 | Egnor et al. |
| 7,248,638 | B1 | 7/2007 | Banister |
| 7,593,489 | B2 | 9/2009 | Koshy et al. |
| 7,616,699 | B2 | 11/2009 | Niu et al. |
| 7,751,506 | B2 | 7/2010 | Niu et al. |
| 2003/0215006 | A1 | 11/2003 | Raghothaman |
| 2005/0047517 | A1 | 3/2005 | Georgios et al. |
| 2005/0130694 | A1 | 6/2005 | Medvedev et al. |
| 2005/0255808 | A1 | 11/2005 | Ahmed et al. |
| 2007/0076582 | A1 | 4/2007 | Tanaka et al. |
| 2007/0098094 | A1 | 5/2007 | Yue et al. |
| 2007/0191067 | A1 | 8/2007 | Nguyen et al. |
| 2008/0187065 | A1* | 8/2008 | Chang et al. ............. 375/267 |

OTHER PUBLICATIONS

International Preliminary Report on Patentability in International Application No. PCT/US08/67546, filed Jun. 19, 2008, mailed Jan. 7, 2010.

Notice of Allowance and Fee(s) Due Mailed Aug. 19, 2010 in U.S. Appl. No. 11/957,409, filed Dec. 14, 2007.

U.S. Appl. No. 60/936,340, filed Jun. 19, 2007.

"Channel Estimation for Multicarrier Systems", Available at http://www.elet.polimi.it/dsp/tlc/ofdm.htm Nov. 30, 2007.

Owen, A., "Latin Supercube Sampling for Very High Dimensional Simulations," ACM Trans. Model. Comput. Simulation, vol. 8, No. 2, pp. 71-102, 1996.

3GPP, R1-062650, Texas Instruments, "Codebook Design for E-ULTRA MIMO Precoding," Oct. 9, 2006.

Ahmed, N., Khojastepour, M. A., Sabharwal, A., and Aazhang, B., "Outage Minimization Feedback for the Fading Relay Channel," IEEE Trans. Commun., vol. 54, No. 4, pp. 659-669, Apr. 2006.

Alamouti, S. M., "A Simple Transmit Diversity Technique for Wireless Communications." IEEE J. Select. Areas Commun., 16(8): 1451-1458, Oct. 1998.

Alspach. D. L. and Sorenson, H. W., "Nonlinear Bayesian Estimation Using the Gaussian Sum Approximation," IEEE Trans. Autom. Control, vol. 17, pp. 439-448, 1972.

Altera. "Implementing OFDM Using Altera Intellectual Property,"White Paper, Mar. 2001.

Arulampalam, S, Maskell, S., Gordan, N., and Clapp, T., "A Tutorial on Particle Filter for On-Line Nonlinear/Non-Gaussian Bayesian Tracking," IEEE Trans. Signal Process., vol. 50. No. 2, pp. 174-188. Feb. 2002.

Banister, B. C. and Zeidler, J. R., "A Simple Gradient Sign Algorithm for Transmit Antenna Weight Adaption With Feedback", IEEE Trans. on Sign. Proc., vol. 51, No. 5, pp. 1156-1171, May 2003.

Banister, B. C. and Zeidler, J. R., "Feedback Assisted Stochastic Gradient Adaption of Multiantenna Transmission", IEEE Trans. on Wireless Commun., vol. 4, No. 3, pp. 1121-1135, May 2005.

Banister, B. C. and Zeidler, J. R., "Feedback Assisted Transmission Subspace Tracking for MIMO Systems", IEEE J. on Select. Areas in Commun., vol. 21, No. 3, pp. 452-463, Apr. 2003.

Berrou, Claude, Glavieux, A., and Thitimajshima, P. "Near Shannon Limit Error—Correcting Coding and Decoding: Turbo-Codes (1)," Ecole Nationale Superieure des Telecommunications de Bretagne, France, 1991.

Caire, G., Guernghar, S., Roumy, A., and Verdu, S. "Maximizing the Spectral Efficiency of Coded CDMA Under Successive Decoding," IEEE Trans. Inform. Theory, vol. 50, No. 1, pp. 152-164, Jan. 2004.

Crisan. D. and Doucet, A.. "A Survey of Covergence Results on Particle Fillering for Practitioners," IEEE Trans. Signal Process., vol. 50, No. 3, pp. 736-746, Mar. 2002.

Cui, T. and Tellambura, C., "Robust Joint Frequency Offset and Channel Estimation for OFDM Systems," IEEE Veh. Tech. Conf. 2004, vol. 1, pp. 603-607, Sep. 26-29, 2004.

Doucet. A. and Wang, X., "Monte Carto Methods for Signal Processing," IEEE Sign. Proc. Mag.. vol. 22, No. 6, pp. 152-170, Nov. 2005.

Doucet, A., de Freitas, J. F. G., and Gordon. N., "Sequential Monte Carlo in Practice", Cambridge, U.K.: Cambridge University Press, 2001.

Doucet, A., Godsill, S. J., and Andrieu, C., "On Sequential Simulation-Based Methods for Bayesian Filtering," Stat. Comput., vol. 10, No. 3, pp. 197-208, 2000.

Farrokhi, F. R., Tassiulas, L., and Liu, K. J. R., "Joint Optimal Power Control and Beamforming in Wireless Networks Using Antenna Arrays," IEEE Trans. Commun., vol. 46, No. 10, pp. 1313-1324, Oct. 1998.

Fearnhead, P., "Using Random Quasi-Monte-Carlo Within Particle Filters, With Application to Financial Time Series," J. Computat. Graph. Stat., vol. 14, pp. 751-769, 2005.

Fortman, T. E., Bar-Shalom, Y., and Scheffe, M., "Sonar Tracking of Multiple Targets Using Joint Probabilistic Data Association," IEEE J. Ocean. Eng., vol. OE-8, No. 7, pp. 173-184, Jul. 1983.

Foschini, G. J., "Layered Space-Time Architecture for Wireless Communication in a Fading Environment When Using Multi-Element Antennas," Bell Labs Tech. J., 1(2): 41-59, Oct. 1996.

Gerstner, T., and Griebel, M., "Numerical Integration Using Sparse Grids," Numerical Algorithms, vol. 18, No. 4, pp. 209-232, 1998.

Gesbert, D., Shafi, M., Shiu, D. S., Smith, P. J., and Naguib, A., "From Theory to Practice: An Overview of MIMO Space-Time Coded Wireless Systems," IEEE J. Select. Areas Commun., vol. 21, No. 3, pp. 281-302, Apr. 2003.

Geweke, J., "Bayesian Inference in Econcometric Models Using Monte Carlo Integration," Econometrica, vol. 57, No. 6, pp. 1317-1339, 1989.

Gordon, N. J., Salmon, D. J., and Smith, A. F. M., "A Novel Approach to Nonlinear/Non-Gaussian Bayesian State Estimation," Inst. Elect. Eng. Proc. Radar Signal Process., vol. 140, pp. 107-113, 1993.

Guo, D., and Wang, X., "Quasi-Monte Carlo Filtering in Nonlinear Dyanmic Systems," IEEE Trans. Sign. Proc., vol. 54, No. 6, pp. 2087-2098, Jun. 2006.

Guo, D., Wang, X., and Chen, R., "New Sequential Monte Carlo Methods for Nonlinear Dyanmic Systems," Stat. Comput., vol. 15, No. 2, pp. 135-147, 2005.

Handschin, J. E., "Monte Carlo Techniques for Prediction and Filtering of Nonlinear Stochastic Processes," Automatica, vol. 1970, No. 6, pp. 555-563, May 2003.

Harvey, A., "Forecasting, Structure Time Series Models and the Kalman Filter", U.K.: Cambridge Univ. Press, 1989.

Henderson, S., Chiera, R., and Cooke, R., "Generating 'Dependent' Quasirandom Numbers," In Proc. 2000 Windter Simulation Conf., J. Joins, R. Barton, and P. Fishwick, Eds., 2000, pp. 527-536.

Hue, C., Cadre, J. and Perez, P., "Sequential Monte Carlo Methods for Multiple Target Tracking and Data Fusion," IEEE Trans. Signal Process., vol. 50, No. 2, pp. 309-325, Feb. 2002.

International Search Report and Written Opinion of the International Searching Authority, International Patent Application No. PCT/US2008/067546.

Ito, K. and Xiong, K., "Gaussian Filters for Nonlinear Filtering Problems," IEEE Trans. Autom. Control, vol. 45, No. 5, pp. 827-910, May 2000.

Julier, J. and Durront-Whyte, H. F., "A New Method for the Nonlinear Transformation of Means and Covariances in Filters and Estimators," IEEE Trans. Autom. Control, vol. 45, No. 3, pp. 477-482, Mar. 2000.

Keller, T. and Hanzo, L., "Adaptive Multicarrier Modulation: A Convenient Framework for Time-Frequency Processing in Wireless Communications," IEEE Proc., vol. 88, No. 5, pp. 611-640, Apr. 2000.

Kotecha, J. and Djuric, P., "Gaussian Sum Particle Filtering," IEEE Trans. Signal Process., vol. 51, No. 10, pp. 2602-2612, Oct. 2003.

L'Ecuyer, P. and Lemieux, C., "recent Advanced in Randomized Quasi-Monte Carlo Methods", Boston, MA: Kluwer Academic, 2002. Modeling Uncertainty: An Examination of Stochastic Theory, Methods, and Applications.

Leung, W. K., Wu, K. Y., and Ping, Li. "Interleave-Division-Multiplexing Space-Time Codes." In Proc. 2003 IEEE Veh. Tech. Conf. (VTC'03 Spring), pp. 1094-1098, Jeju, Korea, Apr. 2003.

Li, C., Li, K., Wang, X., and Ping, L. An interleave-Division-Multiplexing MISO System with Partial CSI at Transmitter. IEEE Trans. Veh. Tech., to appear.

Li, K. and Wang, X. "Exit Chart Anaiysis of Turbo Multiuser Detection, 41st Ann. Allerton Conf. Commun., Control, & Computing," Allerton, IL, USA, Oct. 2003.

Li. K., Ping. L., and Wang. X. "Analysis and Optimization of Interleave-Division Multiple-Access Communication Systems," In Proc. of IEEE Int'l Conf. on Accoust. Speech & Sig. Proc., Philadelphia, PA, Mar. 2005.

Li, S., Huang, D., Letaief, K. B., and Zhou Z., "Multi-Stage Beamforming for Coded OFDM with Multiple Transmit and Multiple Receiver Antennas," IEEE Trans. Wireless Commun., vol. 6, No. 3, pp. 959-969, Mar. 2007.

Li, Y., Seshadri, N., and Ariyavisitakul, S., "Channel Estimation for OFDM Systems with Transmitter Diversity in Moblie Wireless Channels," IEEE J. Select. Areas Commun., vol. 17, No. 3, pp. 461-471, Mar. 1999.

Liu, J. S. and Chen, R., "Sequential Monte Carlo Methods for Dyanamic Systems," J. Amer. Statist. Assoc., vol. 93, pp. 1032-1044, 1998.

Liu, J. S., "Monte Carlo Strategies for Scientific Computing". New York: Springer-Verlag, 2001.

Liu, L. and Jefarkhani, H., "Successive Transmit Beamforming Algorithms for Mutliple-Antenna OFDM Systems," IEEE Trans. Wireless Commun., vol. 6, No. 4, pp. 1512-1522: Apr. 2007.

Liu, Z., Xin, Y., and Giannakis. G. B., "Linear Constellation Precoding for OFDM with Maximum Multipat Diversity and Coding Gains," IEEE Trans. Commun., vol. 51, No. 3, pp. 416-427, Mar. 2003.

Marsaglia, G. and Zaman, A., "Rapid Evaluation of the Inverse of the Normal Distribution Function," Statist. Prob. Lett., vol. 19, pp. 259-266, 1994.

Mondal, B. and Heath, R. W., "Channel Adaptive Quantization for Limited feedback MIMO Beamforming Systems," IEEE Trans. Sign. Proc., vol. 54, No. 12, pp. 4717-4729, Dec. 2006.

Office Action dated Aug. 30, 2010 in U.S. Appl. No. 11/957,385.

Ormoneit, D., Lemieux, C. and Fleet, D., "Lattice Particie Filters," Proc. 17th Annu. Conf. Uncertainty in Artificial Intelligence, pp. 395-402, 2001.

Owen, A., "Monte Carlo Variance of Scrambled Net Quadrature," SIAM J. Numer. Anal., vol, 34, No. 5, pp. 1884-1910, 1997.

Pande, T., Love, D. J., and Krogmeier, J. V., "A Weighted Least Squares Approach to Precoding with Pilots for MIMO-OFDM," School of Electrical and Computer Engineering, Purdue University, Dec. 14. 2005.

Papadias, C. B. and Foschini, G. J. "Capacity-Approaching Space-Time Codes for Systems Employing Four Transmitter Antennas." IEEE Trans. Inform. Theory, 49(3): 726-733, Mar. 2003.

Papageorgiou, A., "Fast Convergence of Quasi-Monte Carlo for a Class of Isotropic Integrats." Math. Computat., vol. 70. No. 4, pp. 297-306, 2001.

Petras, K., "Fast Calculation of Coefficients in the Smolyak Algorithm," Numerical Algorithms, vol. 26, No. 2, pp. 93-109. 2001.

Philomin, V., Duraiswami, R., and Davis, L. S., "Quasirandom Sampling for Condensation," in Proc. Eur. Conf. Computer Vision, 2000, pp. 134-149.

Ping, L., Leung, W. K., and Wu. K. Y. "Low-Rate Turbo-Hadamard Codes" IEEE Trans. Inform. Theory, vol. 49, No. 12, pp. 3213-3224, Dec. 2003.

Ping, L., Liu, L., Wu, K., and Lehung, W. K. "Interleave Division Multiple Access(IDMA) Communication Systems," 3rd Int'l Symp. Turbo Codes & Related Topics, pp. 173-180, Brest, France, Sep. 2003.

Price, K. and Storn, R. "Differential Evolution—A Simple and Efficient Heuristic for Global Optimization Over Continuous Spaces." J. Global Optimization, 11:341-359, 1997.

Proakis, J. G., "Digital Communications," 4th. ed., New York: McGraw-Hill, 2001.

Pukkila, M., "Channel Estimation Modeling," Nokia Research Center, HUT Dec. 19, 2000.

Richardson, T., Shokrollahi, A., and Urbantke, R. "Design of Capacity-Approaching Irregular Low-Density Parity-Check Codes," IEEE Trans. Inform. Theory, vol. 47, No. 2, pp. 619-637, Feb. 2001.

Roh, J. C. and Rao, B. D., "Transmit Beamforming in Mutliple-Antenna Systems with Finite Rate Feedback: A VQ-Based Approach," IEEE Trans. Inf. Theory, vol. 52, No. 3, pp. 1101-1112, Mar. 2006.

Sellathurai, M. and Haykin. S. "Turbo-Blast for Wireless Communications: Theory and Experiments." IEEE Trans. Sig. proc., 50(10):2536-2546, Oct. 2002.

Sellathurai, M. and Haykin S. "Turbo-BLAST: Performance Evaluation in Correlated Rayleigh-Fading Environment." IEEE J. Select. Areas Commun., 21(3):340-349, Apr. 2003.

Shahbazpanahi, S. Gershman, A. B., Luo, Z.-Q., and Wong, K. M., "Robust Adaptive Beamforming for General-Rank Signal Models," IEEE Trans. Sign. Proc., vol. 51, No. 9, pp. 2257-2269, Sep. 2003.

Shamai, S. and Verdu, S. "The Impact of Frequency-Flat Fading on the Spectral Efficiency of CDMA," IEEE Trans. Inform. Theory, vol. 47, No. 4, pp. 1302-1327, May 2001.

Sorenson, H. W., Ed., "Kalman Filtering: Theory and Application", New York: IEEE, 1985.

Tarokh, V., Jafarkhani, H., and Calderbank, A. R. "Space-Time Block Codes from Orthogonal Designs," IEEE Trans. Inform. Theory, 45(4):1456-1467, Jul. 1999.

Tarokh. V., Jafarkhani, H., and Calderbank, A. R. "Space-Time Block Coding for Wireless Communications: Performance Results." IEEE J. Select Areas Commun., 17(3):451-460, Mar. 1999.

Tse, D. and Hanly, S. "Linear Multiuser Receivers: Effective Interference, Effective Bandwidth and User Capacity," IEEE Trans. Inform. Theory, vol. 45, No. 2, pp. 614-657, Mar. 1999.

Tse, D. N. C., Viswanath, P., and Zheng, L., "Diversity-Multiplexing Tradeoff in Multiple-Access Channels," IEEE Trans. Inform. Theory, vol. 50, No. 9, pp, 1859-1874, Sep. 2004.

U.S. Appl. No. 11/957,409, filed Dec. 14, 2007.
U.S. Appl. No. 11/957,385, filed Dec. 14, 2007.
U.S. Appl. No. 60/875,416, filed Dec. 14, 2006.
U.S. Appl. No. 60/875,417, filed Dec. 14, 2006.

Wang, X. and Hickernell, F., "Randomized Halton Sequences," Math. Comput. Model., vol. 32, No. 4, pp. 887-899, 2000.

Wang, X.and Poor, H. V. "Iterative (Turbo) Soft Interference Cancellation and Decoding for Coded CDMA," IEEE Trans. Commun., 46(7):1046-1061, Jul. 1999.

West, M. and Harrison. J., "Bayesian Forecasting and Dynamic Models", New York: Springer-Verlag, 1989.

West, M., "Mixture Models, Monte Carlo, Bayesian Updating and Dynamic Models," Comput. Sci. Stat., vol. 24, pp. 325-333, 1993.

Wu, K. Y., Leung, W. K., and Ping: Li. "A Simple Approach to Near-Optimal Multiple Transmit Antenna Space-Time Codes." In Proc. 2003 IEEE Int. Conf. Commun. (ICC'03), pp. 2603-2607, Anchorage, AK, May 2003.

Wu. K Y., Ping. L., and Leung, W. K. "Multi-layer Turbo Space-Time Codes for High-Rale Applications," In Proc. 2004 IEEE Global Telecommum. Conf. (GLOBECOM'04), pp. 3758-3762, Dallas, TX, Dec. 2004.

Yang, H., "A Road to Future Broadband Wireless Access: MIMO-OFDM-Based Air Interface," IEEE Commun. Mag., vol. 43. No. 1, pp. 53-60, Jan. 2005.

Zuccardi Merli. F. and Vitetta. G. M., "Blind Feedforward Frequency Estimation for OFDM Signals Transmitted Over Multipath Fading Channels," IEEE Int. Conf. Commun., vol. 6, pp. 2881-2886, Jun. 11-15, 2006.

* cited by examiner

METHODS AND SYSTEMS FOR PROVIDING FEEDBACK FOR BEAMFORMING AND POWER CONTROL

CROSS REFERENCE TO RELATED APPLICATION

This application claims the benefit of U.S. Provisional Patent Application No. 60/936,340, filed Jun. 19, 2007, which is hereby incorporated by reference herein in its entirety.

TECHNICAL FIELD

The disclosed subject matter relates to methods and systems for providing feedback for beamforming and power control.

BACKGROUND

Digital wireless communication systems have gained widespread adoption in recent years. Common examples of digital wireless communication systems include wireless routers, which are frequently made according to the IEEE 802.11 standards, and mobile telephones.

A common problem with digital communication systems is multi-path fading as multiple copies of a signal propagate from a transmitter to a receiver via different paths. For example, one copy of a signal can propagate via a straight line between a transmitter and a receiver and another copy can propagate via a reflection off a structure between the transmitter and the receiver. Because the two copies of the signals are taking different paths, the copies will be out of phase when they reach the receiver. This can result in constructive or destructive interference. As a receiver moves relative to a fixed transmitter, the receiver will either pick up a stronger or weaker sum of the copies of the signal. This variation is fading in the signal.

To address multi-path fading problems, as well as other forms of signal degradation, orthogonal frequency divisional multiplexing (OFDM) has been adopted in many digital wireless systems. OFDM operates by sending digital signals across many different orthogonal subcarriers (or channels). Unlike some other forms of communication which attempt to send a large amount of data over a single carrier at high speed, OFDM spreads the data across multiple subcarriers at lower speeds. This enables OFDM systems to be more robust to interference problems.

To further improve the performance of OFDM wireless systems, multiple-input and multiple-output (MIMO) configurations of OFDM systems have been adopted. In a typical configuration, a MIMO system may use two or more transmit antennas and two or more receive antennas. By controlling the signals being output on these transmit antennas, beamforming can be used to control the beam shape of the transmitted signal. By controlling the shape of the beam transmitted by the antennas, various forms of signal degradation, including multi-path fading, can be reduced.

SUMMARY

Methods and systems for providing feedback for beamforming and power control are provided. In some embodiments, methods for controlling transmit-power between a wireless transmitter and a wireless receiver are provided, the methods comprising: calculating a threshold associated with a subcarrier between the transmitter and the receiver; receiving the subcarrier containing an information symbol at the receiver from the transmitter; determining a channel estimate of the subcarrier and a weighting vector for the information symbol; based at least on the channel estimate and the weighting vector, determining a power level of the subcarrier; comparing the power level to the threshold; generating a feedback signal to the transmitter indicating a first energy level to be used for the subcarrier based on the comparison of the power level to the threshold; subsequent to generating the feedback signal, determining a second power level of the subcarrier based at least on the channel estimate and the weighting vector; comparing the second power level to the threshold; and generating a second feedback signal to the transmitter indicating a second energy level to be used for the subcarrier based on the comparison of the second power level to the threshold.

In some embodiments, systems for controlling transmit-power from a wireless transmitter are provided, the systems comprising: a receiver that: calculates a threshold associated with a subcarrier between the transmitter and the receiver; receives the subcarrier containing an information symbol from the transmitter; determines a channel estimate of the subcarrier and a weighting vector for the information symbol; based at least on the channel estimate and the weighting vector, determines a power level of the subcarrier; compares the power level to the threshold; generates a feedback signal to the transmitter indicating a first energy level to be used for the subcarrier based on the comparison of the power level to the threshold; subsequent to generating the feedback signal, determines a second power level of the subcarrier based at least on the channel estimate and the weighting vector; compares the second power level to the threshold; and generates a second feedback signal to the transmitter indicating a second energy level to be used for the subcarrier based on the comparison of the second power level to the threshold.

In some embodiments, systems for controlling transmit-power from a wireless transmitter are provided, the systems comprising: means for calculating a threshold associated with a subcarrier from the transmitter; means for receiving the subcarrier containing an information symbol from the transmitter; means for determining a channel estimate of the subcarrier and a weighting vector for the information symbol; means for determining a power level of the subcarrier based at least on the channel estimate and the weighting vector; means for comparing the power level to the threshold; means for generating a feedback signal to the transmitter indicating a first energy level to be used for the subcarrier based on the comparison of the power level to the threshold; means for determining a second power level of the subcarrier based at least on the channel estimate and the weighting vector subsequent to generating the feedback signal; means for comparing the second power level to the threshold; and means for generating a second feedback signal to the transmitter indicating a second energy level to be used for the subcarrier based on the comparison of the second power level to the threshold.

DETAILED DESCRIPTION

In accordance with various embodiments, as described in more detail below, mechanisms for providing feedback for updating beamforming weighting vectors and energy levels are provided. These mechanisms can be used in any suitable digital-wireless-communication application. For example, beamforming weighting vectors and energy levels can be applied to symbols being transmitted in wireless MIMO-OFDM systems to improve the performance of the transmissions, or in any other suitable systems (such as other types of MIMO systems). By updating these vectors and energy levels using feedback, the signal power seen by the receivers can be made to respond to dynamic environmental conditions.

As a more particular example, in some embodiments, after initializing a base weighting vector, odd and even weighting vectors can be formed. These odd and even weighting vectors can then be multiplexed with information symbols to be transmitted over various OFDM subcarriers during alternating odd and even intervals, and transmitted by a transmitter. At a receiver, channels estimates for each of the subcarriers can be formed (as known in the art) and used, along with the odd and even weighting vectors (which were locally generated), to form a feedback bit indicating which of the weighting vectors results in greater power at the receiver. This feedback bit can then be transmitted to the transmitter, where it is can be used to update the base weighting vector. After updating the base weighting vector, the actions above can be repeated.

As another example, in some embodiments, additionally or alternatively to beamforming, the energy level(s) used to transmit symbols on one or more subcarriers from a transmitter can be controlled for a subcarrier or a group of subcarriers. These energy levels can be updated using feedback from a receiver. The feedback can be generated by comparing the power seen by the receiver for a subcarrier channel to one or more thresholds. Based on how the power seen compares to the threshold(s), the receiver can instruct the transmitter to modify the power output for the corresponding subcarrier (or a group of subcarriers). When two energy levels and one threshold are used, the feedback signal can be implemented with a single bit.

For the purpose of illustration, various embodiments that implement a MIMO-OFDM system are described below, although the mechanisms described herein can be used in systems other than MIMO-OFDM systems.

Figure 1:
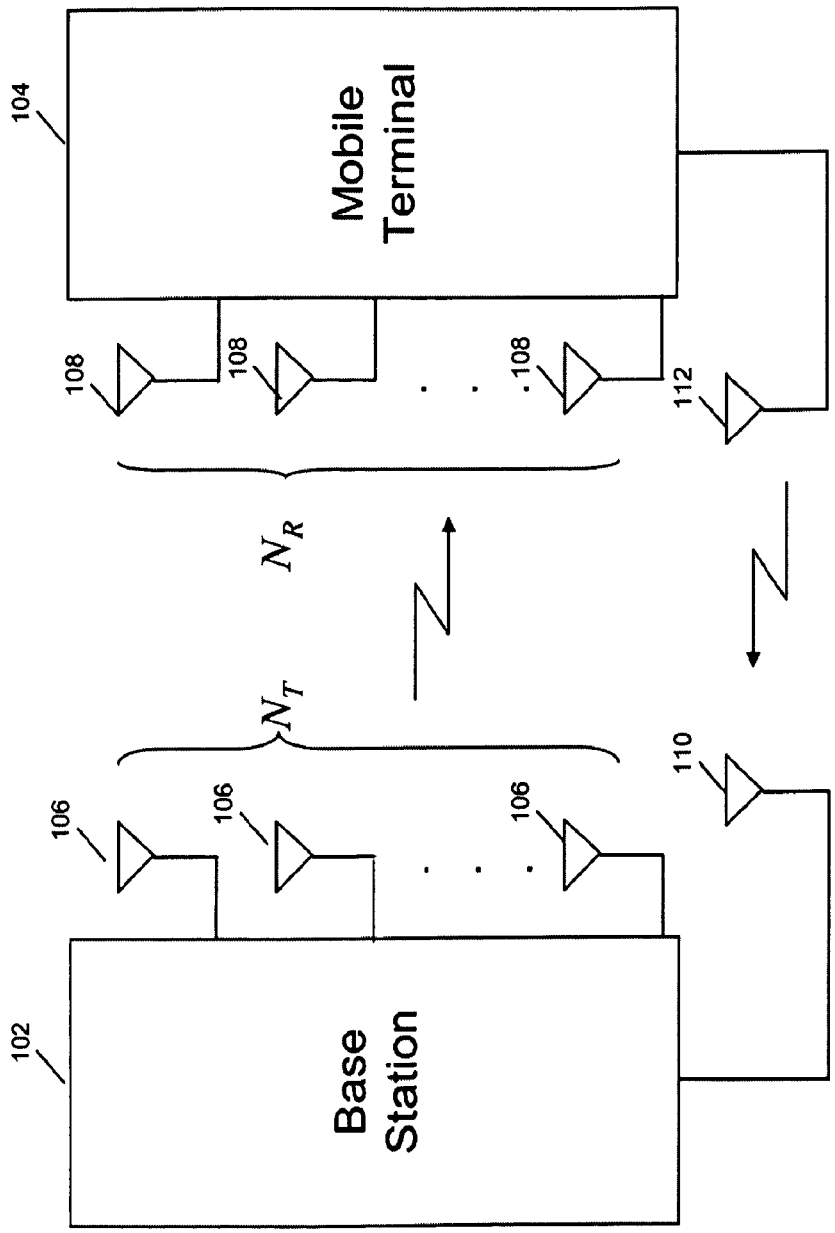
FIG. 1 is a diagram of a system for providing feedback for beamforming and power control in accordance with some embodiments.

For example, as illustrated in FIG. 1, a MIMO-OFDM system 100 can employ $N_T$ transmit antennas 106 at a base station 102 and $N_R$ receive antennas 108 at a mobile terminal 104 for down link transmissions. Separate feedback antenna 110 and 112 can be provided at the transmitter and receiver, respectively.

Figure 2:
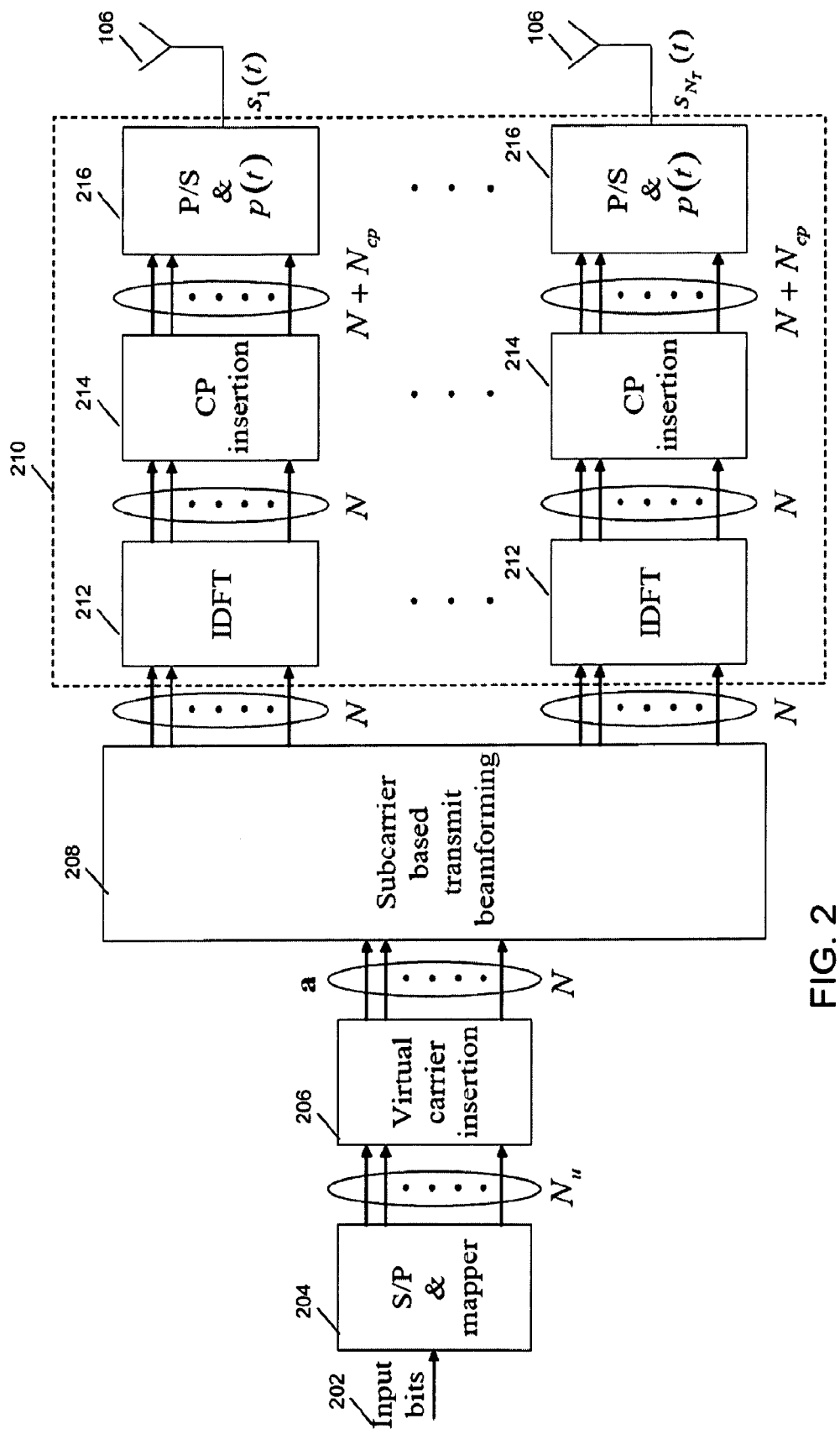
FIG. 2 is a diagram of a mechanism for transmitting a signal in accordance with some embodiments.

A block diagram of a transmitter 200 that can be used in some embodiments of such a system is illustrated in FIG. 2. The processing within transmitter 200 can be performed as follows. First, the input data stream 202 can be mapped into a sequence of M Phase-Shift Keying (PSK) or M Quadrature Amplitude Modulation (QAM) symbols by S/P & Mapper 204. Then, this sequence of symbols can be serial-to-parallel converted (also by S/P & Mapper 204), producing a series of non-overlapping blocks; where each block consists of $N_u$ symbols and where $N_u$ represents the number of useful subcarriers. Then, $N_{vc}=N-N_u$ virtual carriers can be inserted in each block by Virtual carrier insertion 206, resulting in an N-dimensional vector:

$$a \triangleq [a_0, a_1, \ldots, a_{N-1}]^T,$$

where $a_n$ represents the channel symbol associated with the n-th subcarrier. These data blocks can then be fed to an adaptive beamforming mechanism 208 operating on a subcarrier-by-subcarrier basis. For the symbol transmitted over the n-th subcarrier, mechanism 208 can generate an $N_T$-dimensional complex weight vector:

$$w_n \triangleq [w_{n,1}, w_{n,2}, \ldots, w_{n,N_T}]^T,$$

where $w_{n,1}$ is the weight for the i-th transmit antenna 106. The signal transmitted from the $N_T$ antennas 106 over the n-th subcarrier frequency is then $w_n a_n$. This technique, employed for each subcarrier, can thus produce a parallel stream of $N_T$ vectors (each consisting of N elements), which can then be fed to a bank of $N_T$ OFDM modulators 210 where they can undergo an N-th order inverse discrete Fourier transform (IDFT) by IDFT 212 followed by cyclic prefix insertion by CP 214, serial to parallel conversion and transmit filtering by P/S & p(t) 216. Finally, the resultant signal can be transmitted by antennas 106.

In the following, for the purpose of illustration, it is assumed that $N_{cp}$ is the cyclic prefix length, that the impulse response p(t) of the transmit filter in P/S & p(t) 216 is time-limited to the interval $(N_p T_s, N_p T_s)$ (where $T_s$ is the channel symbol interval), and that the Fourier transform P(f) of p(t) is the root of a raised cosine with roll-off α, so that $N_u=\text{int}[N(1-\alpha)]$.

The OFDM signal can be transmitted over a wide sense stationary uncorrelated scattering (WSS-US) multipath fading channel. The tapped delay line model:

$$h_{i,j}(t) \triangleq \sum_{l=0}^{L-1} h_{i,j}[l]\delta(t-lT_s) \quad (1)$$

can be adopted for the channel impulse response between the i-th transmit antenna 106 (i=1, ..., $N_T$) and the j-th receive antenna 108 (j=1, ..., $N_R$). Here, δ(t) denotes the Dirac delta function, L is the number of channel distinct taps and $h_{i,j}[l]$ is the complex gain of the l-th tap. For the purpose of illustration, it is assumed that: (a) the channel is static over each OFDM symbol interval (quasi static channel) and (b) $N_{cp} \geq 2N_p + L - 1$, so that inter-block interference can be avoided in the detection of each OFDM symbol. At mobile terminal 104, after matched filtering and sampling (wherein the first $N_{cp}$ samples (i.e., the samples associated with the cyclic prefix) can be discarded from each OFDM time interval and ideal timing is assumed), the N samples collected at the j-th receive antenna undergo an N-th order DFT producing the N-dimensional vector:

$$r_j \triangleq [r_j[0], r_j[1], \ldots, r_j[N-1]]^T.$$

It is not difficult to show that this vector can be expressed as:

$$r_j = \frac{ME_b}{N_T} \sum_{i=1}^{N_T} W_i A F_L h_{i,j} + n_j, \quad (2)$$

where:
- $A \triangleq \text{diag}\{a_n, n=0, 1, \ldots, N-1\}$ is an N×N diagonal matrix containing all the elements of a along its main diagonal;
- $h_{i,j} \triangleq [h_{i,j}[0], h_{i,j}[1], \ldots, h_{i,j}[L-1]]^T$ collects the channel gains of $h_{i,j}(t)$ (see equation (1));
- $F_L$ is an N×L DFT matrix with $[F_L]_{p,q} = \exp[-j2\pi pq/N]$;
- p=0, 1, ..., N−1;
- q=0, 1, ..., L−1;
- $w_i \triangleq \text{diag g}\{w_{0,i}, w_{1,i}, \ldots w_{N-1,i}\}$ is an N×N diagonal matrix collecting the complex weights applied to the OFDM symbol sent by the i-th transmit antenna;
- $E_b$ is the total average transmitted energy per information bit over time; and
- $z_j \triangleq [z_j[0], z_j[1], \ldots z_j[N-1]]^T \sim N_c(0, \sigma_z^2 I_N)$ is a noise vector.

For the purpose of illustration, equation (2) can be converted into a subcarrier-based equation. Specifically, the $N_R$-dimensional vector:

$$r[n] \triangleq [r_1[n], \ldots, r_{N_R}[n]]^T,$$

containing the samples from all the receive antennas at the n-th subcarrier, can be expressed as:

$$r[n] = \frac{ME_b}{N_T} H_n w_n a_n + z_n, \quad (3)$$

where:
- $z_n \sim N_c(0, \sigma_z^2 I_{N_R})$ is an $N_R$-dimensional Gaussian noise vector; and
- $H_n = [H_{i,j}[n]]$ (with i=1, ..., $N_T$, j=1, ..., $N_R$) represents an $N_R \times N_T$ matrix collecting the responses of the MIMO channel at the n-th subcarrier frequency.

Note that the N-dimensional vector:

$$H_{i,j} \triangleq [H_{i,j}[0], H_{i,j}[1], \ldots, H_{i,j}[N-1]]^T,$$

collecting the values of the channel frequency response between the i-th transmit and the j-th receive antennas 108, is $$H_{i,j} = F_L h_{i,j}. \quad (4)$$

The received signal vectors r[n], n=0, 1, ..., N−1, in equation (3), at a mobile terminal 104 can be used to generate feedback signals that can be used to (1) update the beamforming vector $w_n$ and (2) set a proper energy level $E_n$ at the base station.

Figure 3:
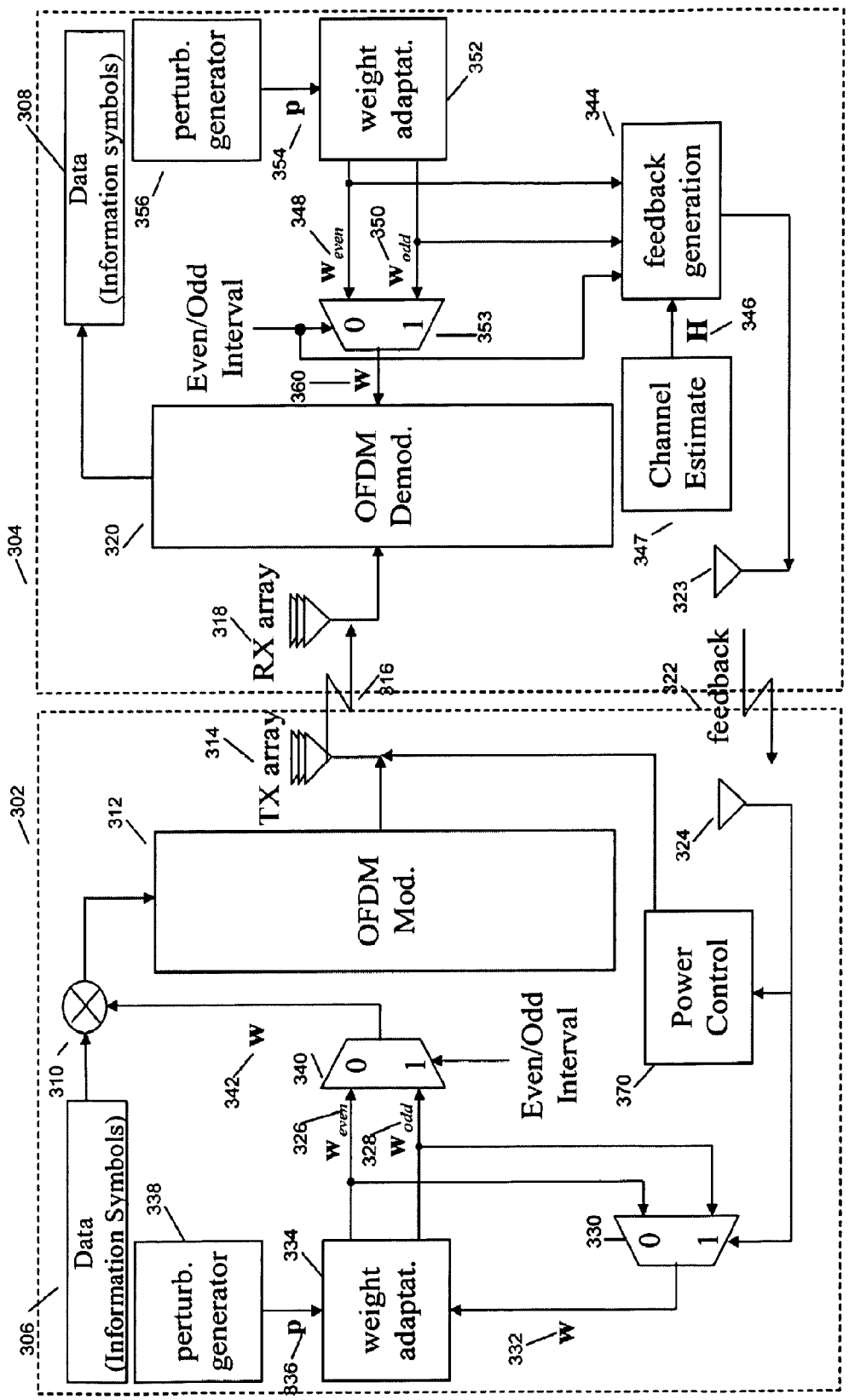
FIG. 3 is a diagram of a system for providing feedback for beamforming in accordance with some embodiments.
Figure 4:
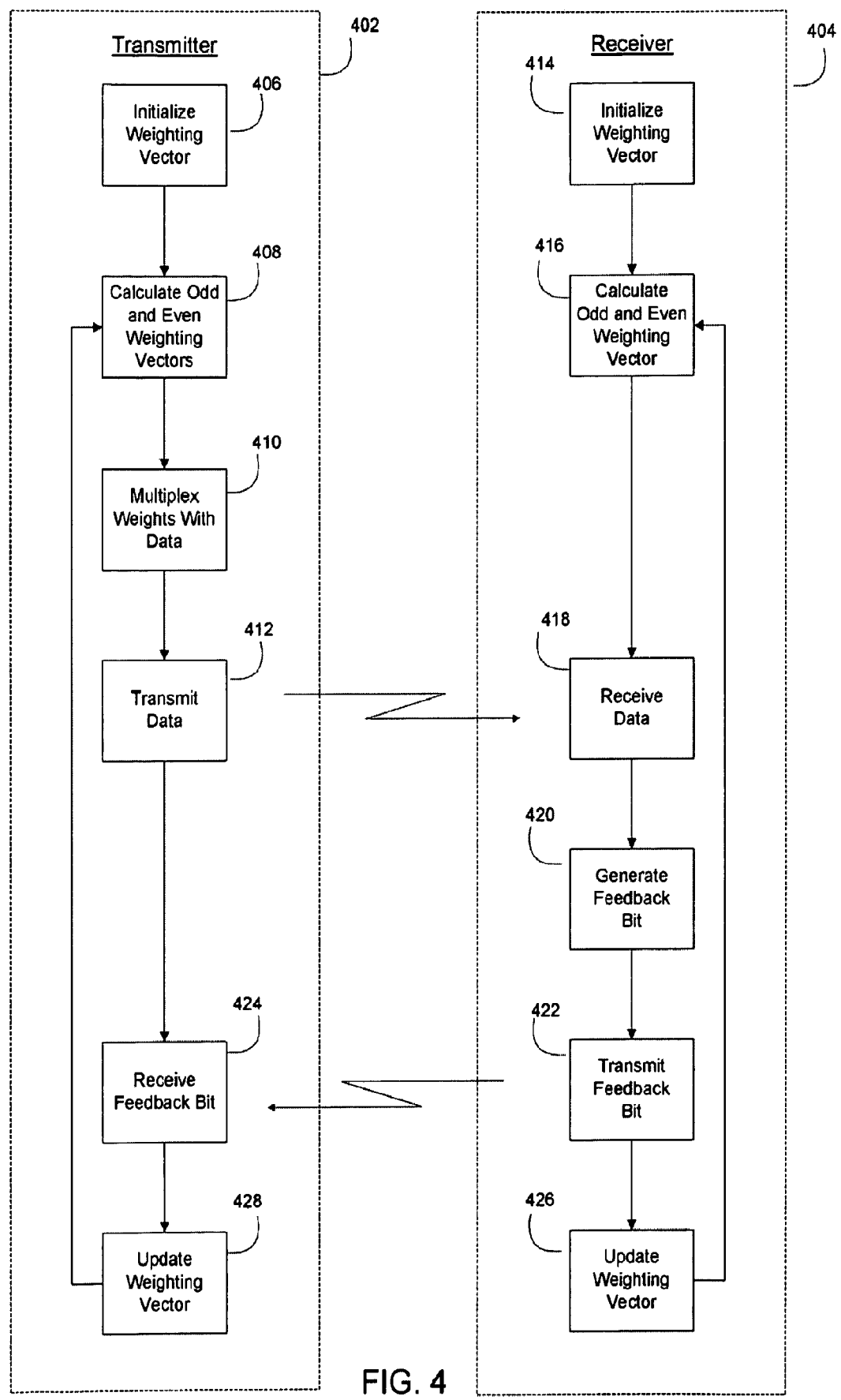
FIG. 4 is a diagram of processes that can be performing in a transmitter and a receiver for providing and using feedback for beamforming in accordance with some embodiments.

Turning to FIGS. 3 and 4, two diagrams illustrating the beamforming of one subcarrier in a MIMO-OFDM system in accordance with some embodiments are shown. Although FIGS. 3 and 4 illustrate the operation of one subcarrier in such a system, any suitable number of subcarriers can be used in systems in accordance with some embodiments, and any one or more of such subcarriers can operate as illustrated in FIGS. 3 and 4.

As illustrated in FIG. 3, data 306 that is input to a transmitter 302 can be transmitted as a signal 316 and then received and output as data 308 by a receiver 304. Data 306 can be provided from any suitable source, such as a digital processing device that is part of, or coupled to, transmitter 302, and can be for any purpose. Similarly, data 308 can be provided to any suitable destination, such as a digital processing device that is part of, or coupled to, receiver 304, and can be for any purpose. Data 306 and data 308 can be in a modulated form using any suitable technique. For example, this data can be Quadrature Phase-Shift Keying (QPSK) modulated, Quadrature Amplitude Modulation (QAM) modulated, etc. In modulated form, data 306 and data 308 can be referred to as information symbols.

To provide beamforming in signal 316 during transmission, a weighting vector 342 can be multiplexed with data 306 by a multiplexer 310. This weighted data can then be provided to an OFDM modulator 312, which can modulate the weighted data. The modulated and weighted data can then be transmitted by a transmitter array 314 to receiver 304. The transmission energy level can be under the control of power control mechanism 370 (as described in more detail below). Any suitable multiplexer, OFDM modulator, power control mechanism, and transmitter array can be used to multiplex, modulate and transmit the data signal. Once the transmitted data signal arrives at receiver 304, the data signal can be received by receiver array 318 and then be provided to OFDM demodulator 320, which can then demodulate signal 316 into data 308. Any suitable receiver array and OFDM demodulator can be used to receive and demodulate the data. Because the data received by the OFDM demodulator is weighted, a weighting vector 360 can be provided to OFDM demodulator 320 to facilitate receiving the signal.

Figure 5:
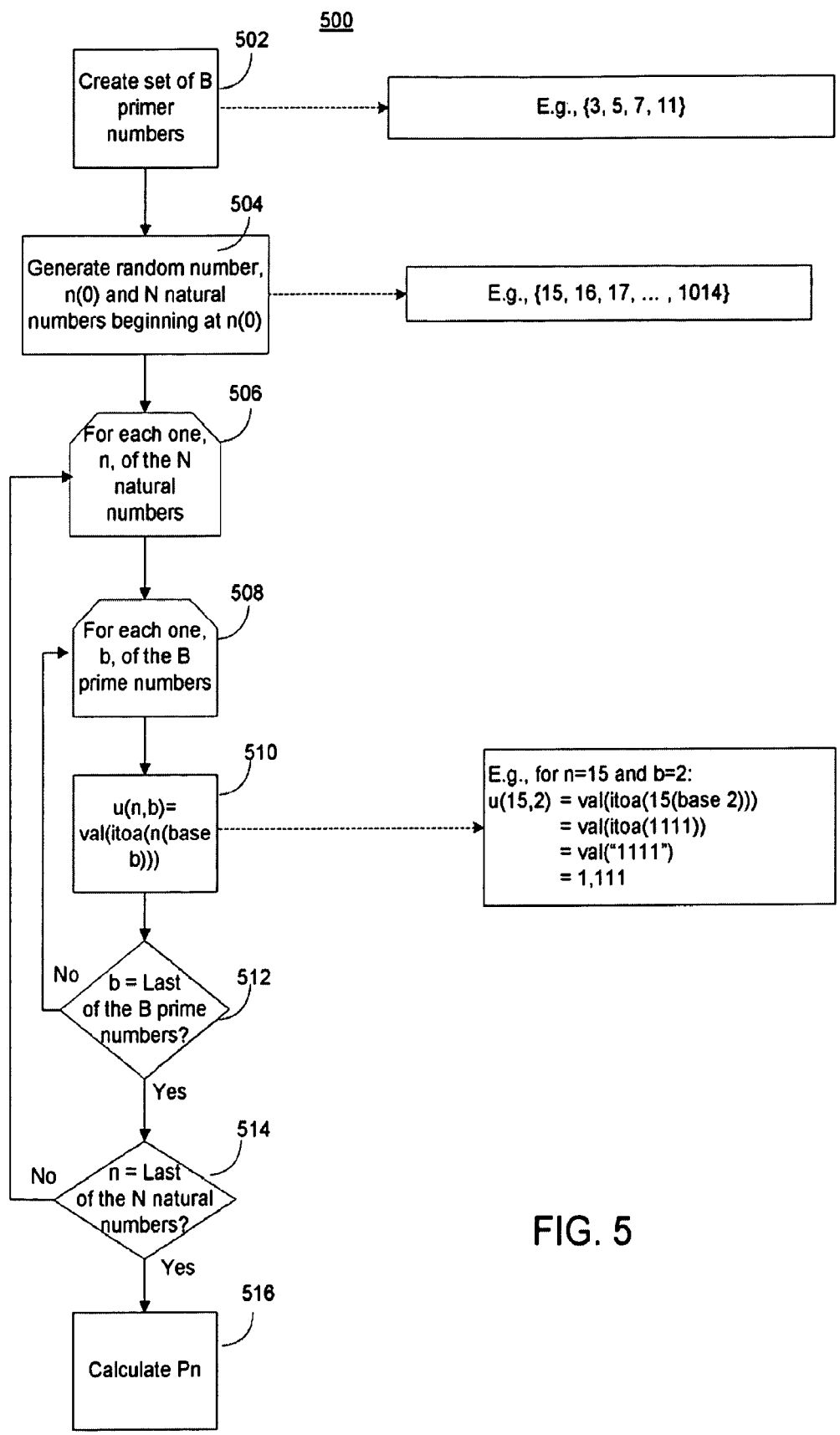
FIG. 5 is a diagram of a process for determining a perturbation vector in accordance with some embodiments.

The weighting vectors that are multiplexed with data 306 can be generated and updated in transmitter 302 to take advantage of feedback from receiver 304. More particularly, as illustrated, a feedback signal 322 can be provided by receiver 304 to transmitter 302 using feedback transmitter 323 and feedback receiver 324. Any suitable transmitter and receiver can be used for feedback transmitter 323 and feedback receiver 324. The feedback signal can then be used to select one of two weighting vectors used during a previous interval—an even weighting vector ($w_{even}$) 326 or an odd weighting vector ($w_{odd}$) 328—at multiplexer 330. The selected weighting vector 332 can then be provided to a weighting adaptation mechanism 334, which can produce a new even weighting vector 326 and a new odd weighting vector 328 using a perturbation 336 created by a perturbation generator 338 (which is described below in connection with FIG. 5). A multiplexer 340 can then select one of the new even weighting vector 326 and new odd weighting vector 328 as the new base weighting vector 342 based on a current even or odd interval slot so that the selected weighting vector can be multiplexed with the data to be transmitted. The application of weighting vectors to data is described further below in connection with FIGS. 7 and 8. Any suitable multiplexers, weighting adaptation mechanisms, and perturbation generators can be used.

To generate feedback signal 322, receiver 304 can include a feedback generation mechanism 344. In generating the feedback signal, feedback generation mechanism 344 can use one or more channel estimates (H) 346, even weighting vector 348, and odd weighting vector 350. The channel estimate(s) can be generated by channel estimate generator 347 using any suitable technique known in the art, such as by using pilot symbols as described in T. Cui, C. Tellambura, "Robust Joint Frequency Offset and Channel Estimation for OFDM Systems," IEEE Veh. Tech. Conf. 2004, vol. 1, pp. 603-607, 26-29 Sep. 2004, which is hereby incorporated by reference herein in its entirety. The odd and even weighting vectors can be produced by weighting adaptation mechanism 352 using perturbation 354 created by perturbation generator 356 (which can operate in the same manner as perturbation generator 338, and which is further described below in connection with FIG. 5). In addition to being used to generate the feedback signal, one of these weighting vectors can be selected by multiplexer 353 to producing weighting vector 360 used by OFDM demodulator 320 to receive signal 316. Any suitable mechanisms can be used to form feedback generation mechanism 344, weight adaptation mechanism 352, perturbation generator 356, and multiplexer 353.

In some embodiments, a digital processing device (e.g., such as a microprocessor) can be used to control weighting vector formation, feedback, and power control. For example, in transmitter 302, perturbation generator 338, weighting adaptation mechanism 334, multiplexers 310, 330, and 340, and power control mechanism 370 can be implemented in a digital processing device running suitable software. As another example, in receiver 304, perturbation generator 356, weighting adaptation mechanism 352, multiplexer 353, and feedback generation mechanism 344 can be implemented in a digital processing device running suitable software.

Turning to FIG. 4, mechanisms for weighting, transmitting, and receiving data, generating feedback, and updating weighting vectors in connection with some embodiments are further illustrated. As mentioned above, FIG. 4 illustrates actions that can be taken in a transmitter 402 and a receiver 404 for one subcarrier of a MIMO-OFDM system, although the same actions can be taken in some embodiments in multiple subcarriers.

As shown at 406, the weighting vector (w) for the subcarrier can be initialized. Any suitable process for initializing the weighting vector can be used. For example, in some embodiments, the initial value for the weighting vector can be calculated randomly. As another example, in some embodiments, a code book can be used to calculate the initial value of w. More particularly, using the values from the codebook of Table 1, $\gamma_k^{LMMSE}$ can be calculated for each entry in the table using the following equation (5):

$$\gamma_k^{LMMSE} = \frac{1}{\sigma^2 [w^H H^H H w + \sigma^2 I]_{k,k}^{-1}} - 1 \tag{5}$$

This equation assumes that receiver 404 is a least-minimum-mean-square-error (LMMSE) receiver. When w possesses a Householder structure, further simplification in equation (5) can be attained. Particularly for the case of a $4 \times N_R \times 2$ system (i.e., four transmitter antennas and two transmission ranks, and any number of receiver antennas), the product term inside the inverse can be written as follows in equation (6):

$$W^H H^H H W = \begin{bmatrix} \|h_1\|^2 & h_1^H h_2 \\ h_2^H h_1 & \|h_2\|^2 \end{bmatrix} - 2 \begin{bmatrix} u_1 u^H H^H h_1 & u_1 u^H H^H h_2 \\ u_2 u^H H^H h_1 & u_2 u^H H^H h_2 \end{bmatrix} - \\ 2 \begin{bmatrix} u_1^* h_1^H Hu & u_2^* h_1^H Hu \\ u_1^* h_2^H Hu & u_2^* h_2^H Hu \end{bmatrix} + 4 \begin{bmatrix} |u_1|^2 u^H H^H Hu & u_1 u_2^* u^H H^H Hu \\ u_2 u_1^* u^H H^H Hu & |u_2|^2 u^H H^H Hu \end{bmatrix} \tag{6}$$

Here, $h_i$ denotes the i-th column vector of the channel matrix (or channel estimate) H and $u_j$ is the j-th element of the vector u. Notice that the above expression only involves matrix-vector operations of three different terms: $u^H H^H h_1$, $u^H H^H h_2$, and $u^H H^H H u$. The rest are simply scalar complex multiplications and additions. This allows significant complexity reduction. A similar technique can be applied to $4 \times N_R \times 3$ scenario or any other configuration.

The value of u that produces the largest value of $\gamma_k^{LMMSE}$ can then be used as the initial value for w.

TABLE 1

$4 \times N_R \times 2$ Householder codebook: 4 bits

| # | u | Rows | # | u | Rows |
|---|---|---|---|---|---|
| 1 | 0.2927<br>0.1298 + 0.6512i<br>−0.0335 − 0.5622i<br>0.1662 + 0.3586i | 1, 2 | 9 | 0.4326<br>−0.4304 + 0.0481i<br>0.6963 − 0.1860i<br>0.1500 + 0.2888i | 1, 2 |
| 2 | 0.5754<br>0.0530 + 0.2187i<br>−0.7569 + 0.1852i<br>0.0209 + 0.1035i | 1, 2 | 10 | 0.4225<br>−0.0582 − 0.3111i<br>−0.4713 − 0.1316i<br>−0.5823 − 0.3779i | 1, 2 |
| 3 | 0.4379<br>0.4527 − 0.0588i<br>−0.3630 − 0.3639i<br>−0.3692 + 0.4465i | 1, 2 | 11 | 0.6569<br>0.1485 − 0.0776i<br>−0.0998 − 0.4801i<br>0.5359 + 0.1125i | 1, 2 |
| 4 | 0.5062<br>−0.1806 − 0.1003i<br>0.6056 + 0.0988i<br>0.2603 − 0.5068i | 1, 2 | 12 | 0.7509<br>−0.4061 − 0.1814i<br>0.0274 + 0.2670i<br>0.0993 − 0.3954i | 1, 2 |
| 5 | 0.0774<br>−0.3019 − 0.1046i<br>−0.2880 + 0.8634i<br>0.2237 + 0.1160i | 1, 2 | 13 | 0.3816<br>0.5020 + 0.1775i<br>0.3039 − 0.5125i<br>0.4323 − 0.1702i | 1, 2 |
| 6 | 0.1056<br>−0.5156 + 0.2733i<br>−0.5343 − 0.2538i<br>−0.5021 + 0.2152i | 1, 2 | 14 | 0.6961<br>0.1961 + 0.5260i<br>−0.0002 − 0.0892i<br>−0.3517 + 0.2622i | 1, 2 |
| 7 | 0.3474<br>0.1465 − 0.4442i<br>0.6611 − 0.4650i<br>−0.0535 + 0.0662i | 1, 2 | 15 | 0.1991<br>0.0523 − 0.4184i<br>0.0165 + 0.4263i<br>0.1029 − 0.7681i | 1, 2 |
| 8 | 0.3585<br>0.0138 + 0.3114i<br>−0.0018 + 0.1268i<br>−0.7014 + 0.5160i | 1, 2 | 16 | 0.1471<br>−0.2071 − 0.4459i<br>0.2385 − 0.1701i<br>0.6400 + 0.4912i | 1, 2 |

In order to facilitate demodulation of data and updating of weighting vectors, the weighting vectors used in the transmitter and the receiver can be synchronized. To do so, for example, as illustrated at 414, receiver 404 can also initialize a weighting vector in the receiver in the same manner as performed at 406. In some embodiments, the weighting vector can be determined as described only at receiver 404 and then provided to transmitter 402 through a feedback channel.

Next, at 408, the odd and even weighting vectors can be calculated using the following equations (7) and (8):

$$w_n^e = \frac{w_n^b + \beta p_n}{\|w_n^b + \beta p_n\|} \tag{7}$$

$$w_n^o = \frac{w_n^b - \beta p_n}{\|w_n^b - \beta p_n\|} \tag{8}$$

where:
n indicates the subcarrier corresponding to this weighting vector.
$p_n$ is a perturbation for the subcarrier.
β is the adaptation rate, which determines how fast the weighting matrices change.
$w_n^b$ is the preferred weight vector (or base weighting vector) previously selected based on feedback, or is the initial value of w, for the subcarrier.

$w_n^e$ is the even weighting vector for the subcarrier.

$w_n^o$ is the odd weighting vector for the subcarrier.

The perturbation vector ($p_n$) can be calculated using any suitable technique. For example, the perturbation vector can be calculated using a Quasi Monte Carlo technique 500 illustrated in FIG. 5. As shown at 502, a first set of B prime numbers can be determined. B can be any suitable number and is based on the number of transmission antennas reflected in the dimensions of the weighting vectors. For example, for B equal to 4 for four transmission antennas, the set of prime numbers can be {3, 5, 7, 11}. Next, at 504, a random number $n_0$ can be generated and the first N natural numbers beginning at $n_0$ identified. Any suitable value for N can be selected, and can be based on the accuracy of tracking the channel modes. For example, for $n_0$ equal to 15 and N equal to 1000, the N identified numbers can be {15, 16, 17, . . . , 1014}. Then, at 506 through 514, for each of the N identified numbers, a set of B elements can be created using respective ones, b, of the B prime numbers. Particularly, for each one, n, of the N identified numbers (looping between 506 and 514), each one of the B elements (looping between 508 and 512) can then be determined by taking the sequence of digits of n when expressed in base b (where b is a respective one of the B prime numbers) and using those digits to form a base 10 number. For example, with n=–15 and b=2, the digits of n when expressed in base b are "1111." These digits can then be used to form the number 1,111 (in base 10). This formation of numbers can be performed for each combination of n and b to form a set of N×B numbers (u(N,B)). As illustrated in the figure, this can be represented in pseudo-code as u(n,b)=val(itoa(n(base b))), where n(base b) is the number n in base b, itoa( ) converts an integer number to a string, and val( ) converts a string to a base 10 number. This set of N×B numbers can be referred to as a Halton Sequence. Next at 516, for each one, n, of the values N in the Halton Sequence, $p_n$ can be calculated using the following equation (9):

$$p_n = \frac{1}{B}\sum_{b=1}^{B} \phi^{-1}(u(n,b)) \qquad (9)$$

where:

$\phi^{-1}$ is an inverse mapping of the Gaussian distribution; and u(n,b) are the B numbers corresponding to each of the N values in the Halton Sequence.

$p_n$ is a gaussian random vector with zero mean and covariance Matrix I (identity matrix).

This process is further described in D. Guo and X. Wang, "Quasi-Monte Carlo filtering in nonlinear dynamic systems", IEEE Trans. Sign. Proc., vol. 54, no. 6, pp. 2087-2098, June 2006, which is hereby incorporated by reference herein in its entirety.

Additionally or alternatively, the perturbation can be calculated using normal Monte-Carlo techniques or randomly. As stated above, any other suitable technique for determining the perturbation vector can be used.

Figure 6:
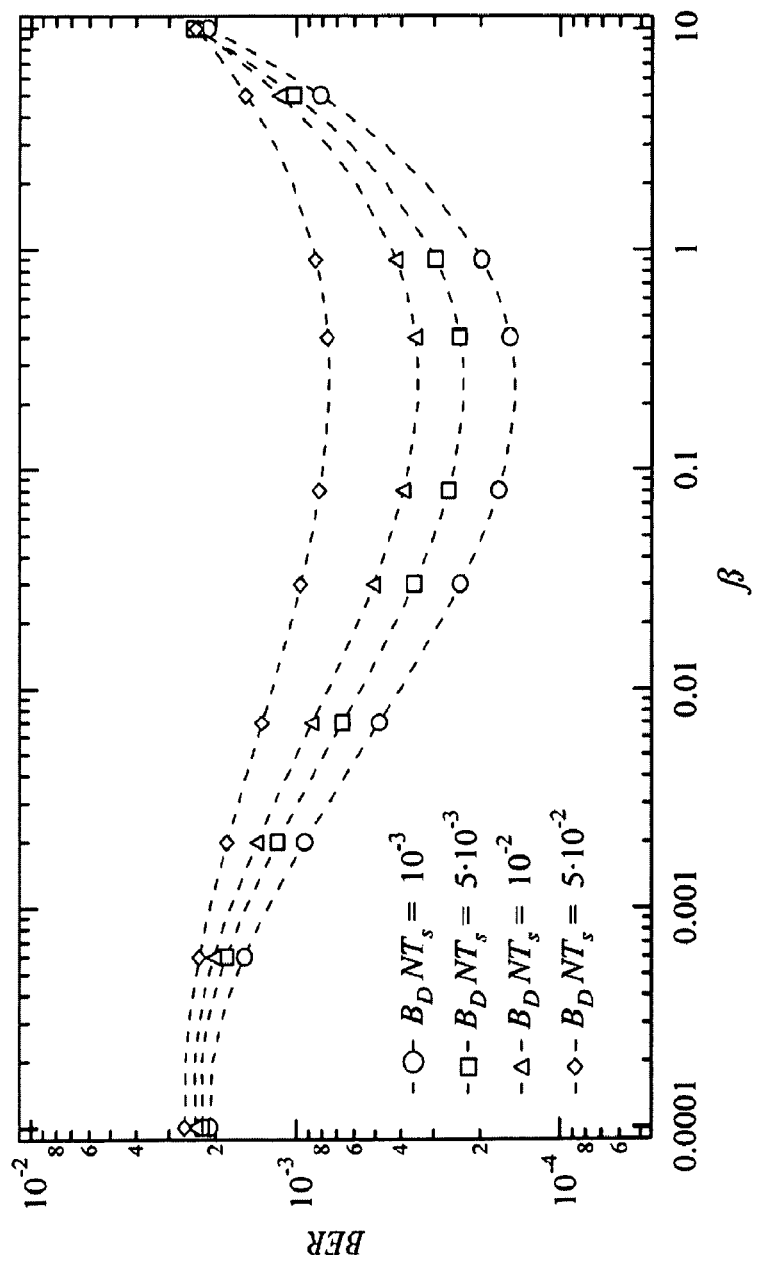
FIG. 6 is a graph illustrating a relationship between values of an adoption rate β used in updating weighting vectors and Bit Error Rates in accordance with some embodiments.

As mentioned above, β is the adaptation rate of the perturbation $p_n$ into the even and odd weighting vectors. In fast changing environments, it can be desirable for the even and odd weighting vectors to change rapidly, and, thus, to use a large value of β. Example values for β versus resultant Bit Error Ratios (BER) are illustrated in FIG. 6 for different normalized Doppler bandwidths ($B_DNT_s$) for motion of the receiver and/or transmitter. Any suitable values for β can be used. For example, β equal to 0.2 can be used.

Returning to FIG. 4, once again, to maintain synchronization between the weighting vectors in the transmitter and receiver, at 416, the odd and even weighting vectors can also be calculated in the same manner as performed at 408

Figure 7:
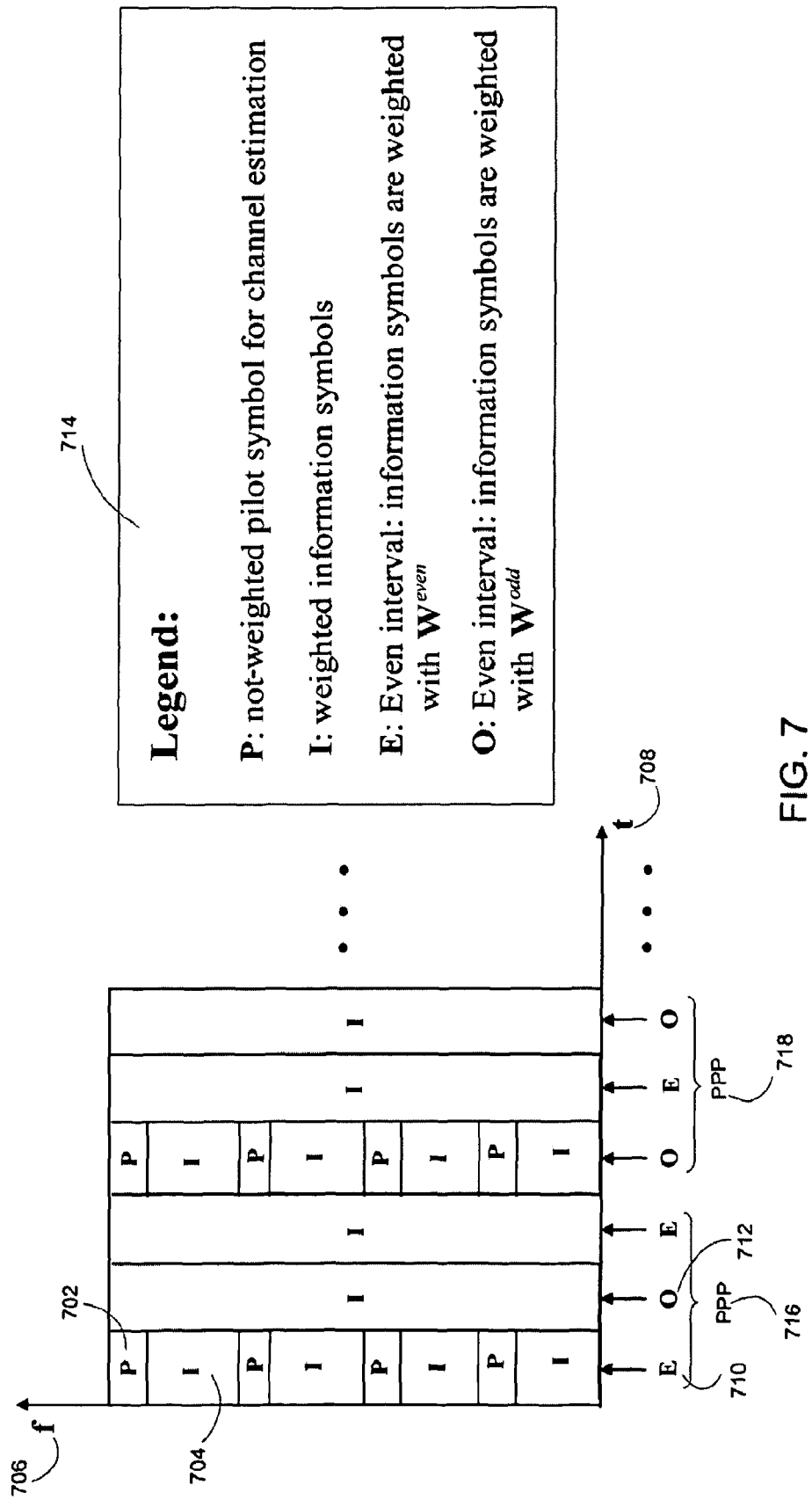
FIG. 7 is a diagram illustrating odd and even intervals containing information symbols and pilot symbols in accordance with some embodiments.
Figure 8:
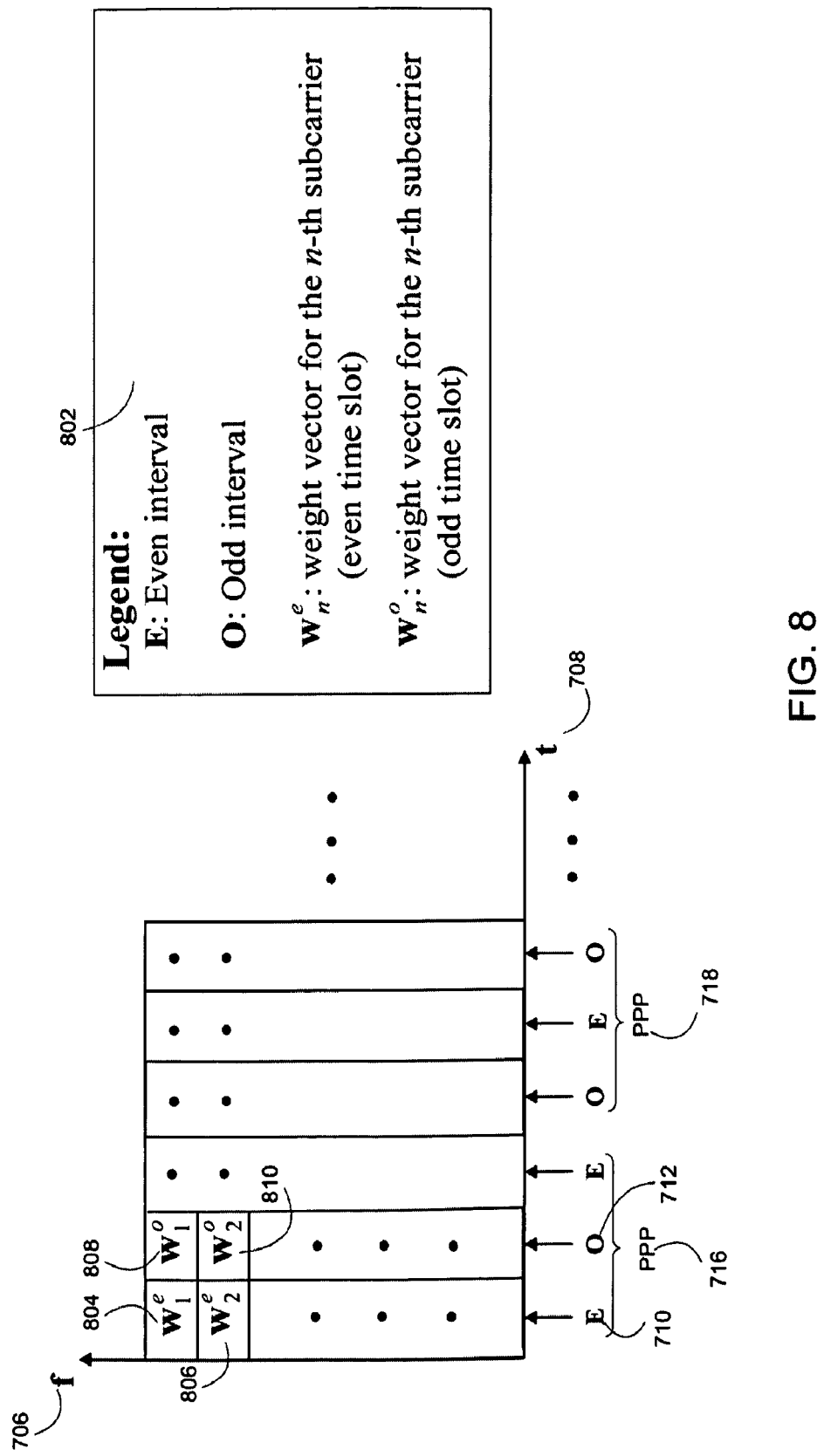
FIG. 8 is a diagram illustrating weighting vectors being applied to different subcarriers (or channels) during different time intervals in accordance with some embodiments.

Next, at 410, the data can be multiplexed with the odd and even weighting vectors in any suitable manner. For example, FIGS. 7 and 8 illustrate ways in which odd and even weighting vectors can be multiplexed with data. As shown in FIG. 7, for different subcarriers of a MIMO-OFDM system (which are represented at different points on f-axis 706), pilot symbols 702 and information symbols 704 can be transmitted at different time intervals 710 and 712 (which are represented at different points on t-axis 708). As indicated in legend 714, pilot symbols 702 can be not-weighted and used for channel estimation (as known in the art), information symbols 704 can be weighted using the even weighting vector during even intervals 710, and information symbols 704 can be weighted using the odd weighting vector during odd intervals 712.

Although pilot symbols are illustrated as being transmitted in every third interval in FIG. 7, and at an even spacing across subcarriers, any suitable approach to transmitting pilot symbols can be used. For example, in some embodiments, pilot symbols can be transmitted more or less frequently and/or on more or less subcarriers. In some embodiments, pilot symbols can be omitted.

As also shown, multiple intervals 710 and 712 can form perturbation probing periods (PPP) 716 and 718. During a PPP, a feedback signal can be generated. This feedback signal can then be used to determine the odd and even weight vectors to be used during the next PPP.

Turning to FIG. 8, the weighting vectors 804, 806, 808, and 810 that can be used over even intervals 710 and odd intervals 712 are illustrated. As shown, a weighting vector $w_1^e$ 804 can be used to weight subcarrier 1 during even interval 710. A weighting vector $w_2^e$ 806 can be used to weight subcarrier 2 during even interval 710. A weighting vector $w_1^o$ 808 can be used to weight subcarrier 1 during interval 712. And, a weighting vector $w_2^o$ 810 can be used to weight subcarrier 2 during interval 712. Although two subcarriers are specifically identified in connection with FIG. 8, any suitable number of the subcarriers can have weighting applied.

Although odd and even intervals are illustrated in FIGS. 7 and 8 as occurring every other interval, any suitable approach for designating intervals as odd or even can be used. For example, a first pair (or any other suitable number) of intervals can be even, and the next pair (or any other suitable number) of intervals can be odd.

Referring back to FIG. 4, after the data is weighted at 410, the weighted data can be transmitted to receiver 404 at 412. This weighted data can then be received at 418. Any suitable technique can be used to transmit and receive the weighted data/information symbols. For example, the data/information symbols can be transmitted using MIMO-OFDM transmitters and receivers.

Next, at 420, the receiver can generate the feedback signal. For example, the feedback signal can be generated as a feedback bit using the following equation (10):

$$b_n = \text{sign}(\|H_n^e w_n^e\|_F^2 - \|H_n^o w_n^o\|_F^2) \qquad (10)$$

where:

$H_n^e$ is the channel gain matrix (or channel estimate) for the even ODFM intervals of a given PPP; and $H_n^o$ is the channel gain matrix (or channel estimate) for the odd ODFM intervals of a given PPP.

Equation (10) results in $b_n$ being equal to +1 if the even weighting vector results in greater power for a given subcarrier n, and being equal to −1 if the odd weighting vector results in greater power for a given subcarrier n. In some embodiments, rather than using different channel gain matrices for the odd and even intervals, a single channel gain matrix can be used.

This feedback bit can then be transmitted from receiver 404 to transmitter 402 at 422 and 424. Any suitable technique for transmitting the feedback bit from the receiver to the transmitter can be used.

Next, at 426 and 428, the weighting vector in each of the receiver and the transmitter can be updated. For example, using the feedback bit, the weighting vector can be updated using the following equation:

$$w_n^b = \begin{cases} w_n^e, & \text{if } b_n = +1 \\ w_n^o, & \text{if } b_n = -1 \end{cases} \quad (11)$$

That is, if the feedback bit is +1, then the weighting vector is set to the even weighting vector. Otherwise, if the feedback bit is −1, then the weighting vector is set to the odd weighting vector.

After updating the weighting vectors in the receiver and the transmitter, the processes shown loop back to 416 and 408, respectively.

As mentioned above, feedback can also be used to control transmit power on subcarriers of MIMO systems (such as MIMO-OFDM systems having beamformed channels as described above) in some embodiments. Controlling of the energy level $E_n$ for each subcarrier n can be performed according to the following rule:

$$E_n = \begin{cases} E_1, & \text{if } \lambda_n < \tau \\ E_2, & \text{if } \lambda_n > \tau \end{cases}, n = 0, \ldots, N-1 \quad (12)$$

where:
$E_1$ is a first energy level;
$E_2$ is a second energy level;
τ represents a threshold level; and
$\lambda_n$ represents the main power of a beamformed channel seen by a mobile terminal at an n-th subcarrier.

More particularly, $\lambda_n$ can be used to represent the main power of a beamformed channel by the following equation (see also equation (6)):

$$\lambda_n \triangleq w_n^H H_n^H H_n w_n \quad (13)$$

where:
$w_n^H$ represents the Hermetian operation on $w_n$;
$H_n^H$ represents the Hermetian operation on $H_n$;
$H_n$ represents the channel estimate of subcarrier n; and
$w_n$ represents the beamforming weight applied to subcarrier n.

In some embodiments, where beamforming is not used, the power determined in equation (13) can be represented as:

$$\lambda_n \triangleq H_n^H H_n$$

Referring to FIG. 3, feedback generation mechanism 344 in receiver 304 can be used to determine whether the energy level $E_n$ for a subcarrier n should be set to $E_1$ or $E_2$ based on current values $E_1$, $E_2$, $\lambda_n$, and τ using equations (12) and (13), and return any suitable feedback (such as a bit set to 0 for $E_1$ or to 1 for $E_2$) to transmitter 302. Within transmitter 302, a power control mechanism 370 can be used to receive this feedback and control the energy level on the subcarrier generated by transmit array 314. This determination, feedback, and control can be performed for every symbol transmitted on a subcarrier, or periodically (e.g., every m symbols or t time increments), and can be performed at the same and/or different times from the updating of the beamforming weights.

In order to provide this feedback and set $E_n$, the receiver needs to have values for $E_1$, $E_2$, and τ, and the transmitter needs to have values for $E_1$ and $E_2$. In some embodiments, $E_1$, $E_2$, and τ can be calculated in receiver 304 (as described below, for example) and $E_1$ and $E_2$ provided to transmitter 302 through the feedback channel. In some embodiments, the transmitter can perform separate and similar calculations as being performed in the receiver to determine $E_1$ and $E_2$.

The energy levels $E_1$ and $E_2$, and the threshold τ, can be selected to minimize the bit error rate (BER) on each subcarrier n. BER expressions depend on the constellation (e.g., QAM or QPSK) of symbols that is adopted in a transmitter. Formulas for some common constellations can be found in J. G. Proakis, "Digital Communications," 4$^{th}$ ed., McGraw-Hill, New York, N.Y., 2001, which is hereby incorporated by reference herein in its entirety.

Using QPSK as an example (although any other suitable constellation can also be used), the signal-to-noise ratio per bit for the n-th subcarrier in a MIMO-OFDM system can be given by:

$$[SNR]_n = \frac{2E_b}{\sigma_z^2} \lambda_n, \quad (14)$$

and the corresponding average bit error probability can be given by:

$$P_n = \int_0^\infty Q(\sqrt{SNR_n(\lambda_n)}) p(\lambda_n), \quad (15)$$

where:
$\sigma_z^2$ represents the noise variance of the subcarrier signal;
Q represents the probabilistic function related to the subcarrier signal, and is described in J. G. Proakis, "Digital Communications," 4$^{th}$ ed., McGraw-Hill, New York, N.Y., 2001; and
$p(\lambda_n)$ represents the probability density function of $\lambda_n$.

Substituting equation (14) into equation (15) and taking into account rule (12) yields the bit error probability:

$$P_n = \int_0^\tau Q(\sqrt{2E_1 \lambda_n / \sigma_z^2}) p(\lambda_n) d\lambda_n + \int_\tau^\infty Q(\sqrt{2E_2 \lambda_n / \sigma_z^2}) p(\lambda_n) d\lambda_n \quad (16)$$

Energy levels $E_1$ and $E_2$, and threshold τ can then be selected while attempting to minimize this bit error probability $P_n$ under the following time-based energy constraint:

$$q_1 E_1 + q_2 E_2 = E_b, \quad (17)$$

where:

$$q_1 \triangleq \int_0^\tau p(\lambda_n) d\lambda_n;$$

-continued $$q_2 \triangleq \int_\tau^\infty p(\lambda_n)d\lambda_n;$$

and $E_b$ is the total average transmitted energy per information bit over time.

The time-based energy constraint attempts to control the energy level over time so that the average energy level is $E_b$.

This selection can be performed in some embodiments using Lagrange multipliers. For example, to do so, the following Lagrangian function can be defined:

$$L = \int_0^\tau Q\left(\sqrt{2E_1\lambda_n/\sigma_z^2}\right)p(\lambda_n)d\lambda_n + \int_\tau^\infty Q\left(\sqrt{2E_2\lambda_n/\sigma_z^2}\right)p(\lambda_n)d\lambda_n + \mu q_1 E_1 + \mu q_2 E_2 - \mu E_b, \quad (18)$$

and the following system solved:

$$\begin{cases} \dfrac{dL}{dE_1} = \int_0^\tau E_1^{-1/2}\exp(-E_1\lambda_n)\lambda_n^{-1/2} p(\lambda_n)d\lambda_n + \mu q_1 = 0 \\ \dfrac{dL}{dE_2} = \int_\tau^\infty E_2^{-1/2}\exp(-E_2\lambda_n)\lambda_n^{-1/2} p(\lambda_n)d\lambda_n + \mu q_2 = 0 \\ \dfrac{dL}{d\tau} = Q\left(\sqrt{2E_1\tau/\sigma_z^2}\right) + \mu E_1 - Q\left(\sqrt{2E_2\tau/\sigma_z^2}\right) - \mu E_2 = 0 \\ \dfrac{dL}{d\mu} = q_1 E_1 + q_2 E_2 - E_b = 0. \end{cases} \quad (19)$$

From the third equation of system (19) it can be inferred that:

$$\mu = \frac{Q\left(\sqrt{2E_2\tau/\sigma_z^2}\right) - Q\left(\sqrt{2E_1\tau/\sigma_z^2}\right)}{E_1 - E_2} \quad (20)$$

and from the fourth equation of system (19) that:

$$E_2 = \frac{E_b - q_1 E_1}{q_2} \quad (21)$$

Substituting equations (20) and (21) into the second equation of system (19) yields the following system based on $E_1$ and $\tau$:

$$\begin{cases} f(E_1, \tau) = 0 \\ g(E_1, \tau) = 0 \end{cases}$$

This system can be solved iteratively using the Newton-Ralphson method. Given an initial point $(E_1^{(i)}, T^{(i)})$, to simplify the problem $f(E_1, \tau)$ and $g(E_1, \tau)$ can be replaced with the first order Taylor approximation around $(E_1^{(i)}, \tau^{(i)})$:

$$\begin{cases} f(E_1, \tau) \approx f(E_1^{(i)}, \tau^{(i)}) + f_{E_1}(E_1^{(i)}, \tau^{(i)})(E_1 - E_1^{(i)}) + f_\tau(E_1^{(i)}, \tau^{(i)})(\tau - \tau^{(i)}) \\ g(E_1, \tau) \approx g(E_1^{(i)}, \tau^{(i)}) + g_{E_1}(E_1^{(i)}, \tau^{(i)})(E_1 - E_1^{(i)}) + g_\tau(E_1^{(i)}, \tau^{(i)})(\tau - \tau^{(i)}) \end{cases} \quad (22)$$

An iterative algorithm for the joint estimation of $E_1$ and $\tau$ is given by:

$$E_1^{(i+1)} = E_1^{(i)} + \delta_{E_1}, \quad \tau^{(i+1)} = \tau^{(i)} + \delta_\tau \quad (23)$$

where the vector $\delta = [\delta_{E_1}, \delta_\tau]^T$ is the solution of the following system:

$$J(E_1^{(i)}, \tau^{(i)})\delta = -F(E_1^{(i)}, \tau^{(i)}) \quad (24)$$

where $$J(E_1^{(i)}, \tau^{(i)}) = \begin{pmatrix} f_{E_1}(E_1^{(i)}, \tau^{(i)}) & f_\tau(E_1^{(i)}, \tau^{(i)}) \\ g_{E_1}(E_1^{(i)}, \tau^{(i)}) & g_\tau(E_1^{(i)}, \tau^{(i)}) \end{pmatrix} \quad (25)$$

and $$F(E_1^{(i)}, \tau^{(i)}) = \begin{pmatrix} f(E_1^{(i)}, \tau^{(i)}) \\ g_{E_1}(E_1^{(i)}, \tau^{(i)}) \end{pmatrix} \quad (26)$$

The partial derivatives in equations (25) and (26) are given by equations (27), (28), (29), and (30):

$$f_{E_1}(E_1, \tau) = -\int_0^\tau E_1^{-3/2}\exp(-E_1\lambda_n)[\lambda_n^{1/2} + 2E_1\lambda_n^{3/2}]p(\lambda_n)d\lambda_n + q_1\left[\frac{\left(\dfrac{q_1\tau\exp\left(-\tau\dfrac{E_b - q_1 E_1}{q_2}\right)}{2\sqrt{\pi\tau q_2}(E_b - q_1 E_1)} + \dfrac{\tau\exp(-E_1\tau)}{2\sqrt{\pi\tau E_1}}\right)(E_1 - E_b) - }{\dfrac{1}{q_2}\left(Q\left(\sqrt{2\tau\dfrac{E_b - q_1 E_1}{q_2}}\right) - Q(\sqrt{2\tau E_1})\right)}\right]; \quad (27)$$

$$f_\tau(E_1^{(i)}, \tau^{(i)}) = E_1^{-1/2}\exp(-E_1\tau)\tau^{-1/2}p(\tau) + \frac{q_1}{E_1 - \dfrac{E_b - q_1 E_1}{q_2}} \left[\frac{(E_b - q_1 E_1)\exp\left(-\dfrac{E_b - q_1 E_1}{q_2}\tau\right)}{2q_2\sqrt{\pi q_2(E_b - q_1 E_1)\tau}} - \frac{E_1\exp(-E_1\tau)}{2\sqrt{\pi E_1\tau}}\right]; \quad (28)$$

$$g_{E_1}(E_t, \tau) = \int_\tau^\infty \left(-\frac{q_1}{q_2} + \frac{q_1(E_b - q_1 E_1)}{q_2^2}\lambda_n\right)\exp\left(-\frac{E_b - q_1 E_1}{q_2}\lambda_n\right)\lambda_n^{-1/2}p(\lambda_n)d\lambda_n + q_2\left[\frac{\left(\dfrac{q_1\tau\exp\left(-\tau\dfrac{E_b - q_1 E_1}{q_2}\right)}{2\sqrt{\pi\tau q_2}(E_b - q_1 E_1)} + \dfrac{\tau\exp(-E_1\tau)}{2\sqrt{\pi\tau E_1}}\right)(E_1 - E_b) - }{\dfrac{1}{q_2}\left(Q\left(\sqrt{2\tau\dfrac{E_b - q_1 E_1}{q_2}}\right) - Q(\sqrt{2\tau E_1})\right)}\right]; \text{ and} \quad (29)$$

$$g_\tau(E_1^{(i)}, \tau^{(i)}) = -\left(\frac{E_b - q_1 E_1}{q_2}\right)^{-1/2}\exp\left(-\frac{E_b - q_1 E_1}{q_2}\tau\right)\tau^{-1/2}p(\tau) + \frac{q_2}{E_1 - \dfrac{E_b - q_1 E_1}{q_2}}\left[\frac{(E_b - q_1 E_1)\exp\left(-\dfrac{E_b - q_1 E_1}{q_2}\tau\right)}{2q_2\sqrt{\pi q_2(E_b - q_1 E_1)\tau}} - \frac{E_1\exp(-E_1\tau)}{2\sqrt{\pi E_1\tau}}\right]. \quad (30)$$

The probability density function $p(\lambda_n)$ in equations (28) and (30) can be estimated using standard numerical techniques and the integrals in equations (27) and (29) can be solved using Monte Carlo techniques, as known in the art.

Figure 9:
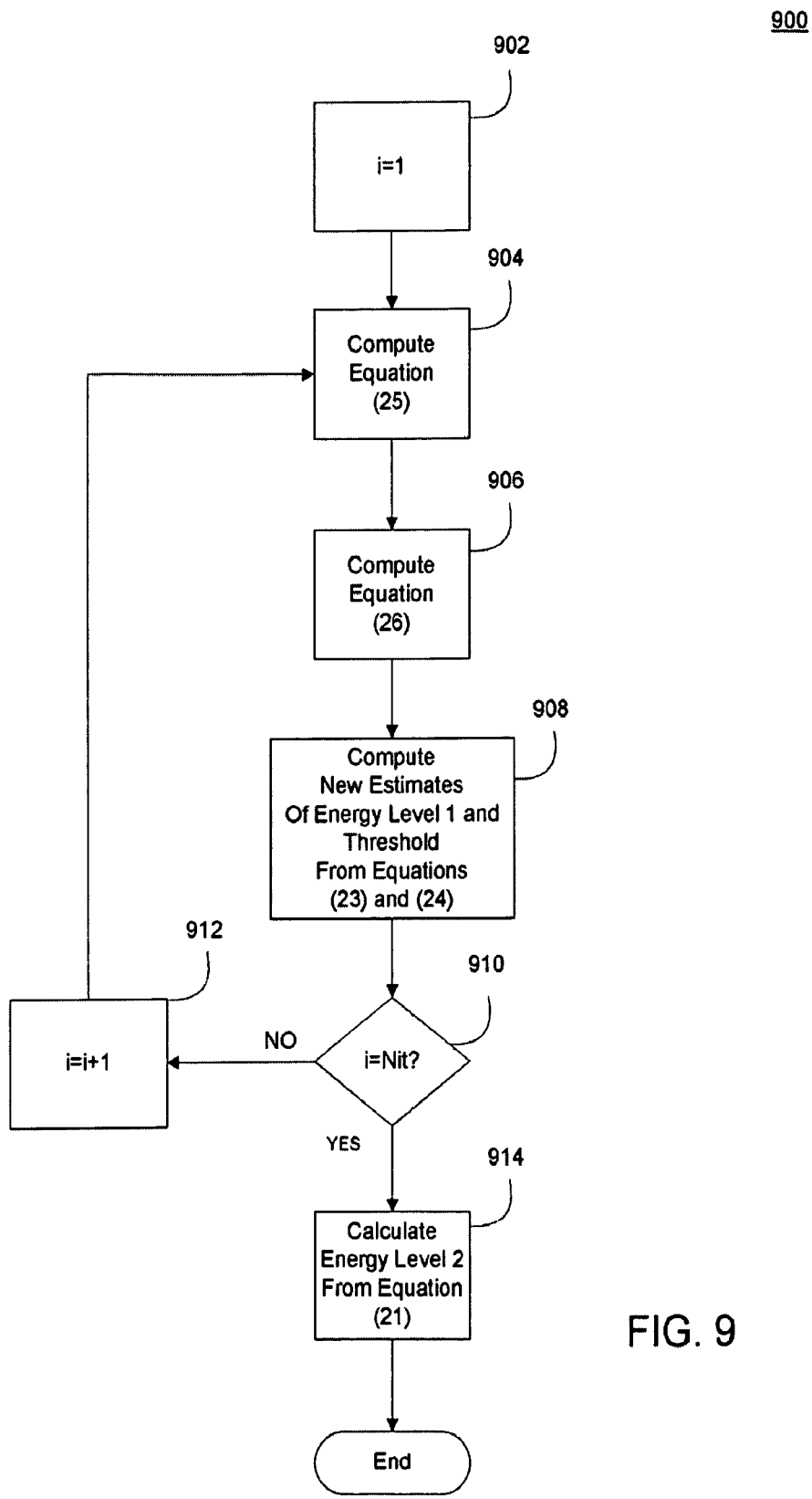
FIG. 9 is a diagram of a process for determining energy levels and thresholds for power control in accordance with some embodiments.

Then, if $N_{it}$ represents the maximum number of the iterations in the Newton-Ralphson method and $E_1^{(0)}=E_b$, $\tau^{(0)}$=median($\lambda_n$) are selected at a first iteration, $E_1$ and $\tau$ can be iteratively estimated, and then $E_2$ computed as illustrated in process 900 of FIG. 9. As shown, this can be performed by setting i=1 at 902, and then computing $J(E_1^{(i)}, \tau^{(i)})$ from equation (25) at 904, $F(E_1^{(i)}, \tau^{(i)})$ from equation (26) at 906, and a new estimate $E_1^{(i+1)}$ for $E_1$ and $\tau^{(i+1)}$ for $\tau$ from equations (23) and (24) at 908. Next, at 910, it can be determined whether i=$N_{it}$. If not, i can be incremented at 912. Otherwise, $E_2$ can be computed from equation (21) at 914 using the final estimate of $E_1$ and $\tau$.

In some embodiments, rather than initializing the weighting vectors in the transmitter and the receiver only once, these vectors are initialized periodically (e.g., every 100 intervals, every 30 PPP, etc.). Similarly, the energy levels $E_1$ and $E_2$ and threshold $\tau$ can be initialized periodically. This can be advantageous in fast changing environments where conditions can rapidly move back to preferring the initial weighting, or something close to it.

As mentioned above, techniques for updating beamforming and power control are illustrated for a single subcarrier. These techniques can be used across multiple subcarriers in some embodiments. For example, rather than performing these techniques for each subcarrier, in some embodiments, multiple subcarriers can be grouped and these techniques can be performed on a subset of the subcartiers—e.g., the center subcarrier. The weighting vector, energy levels, and/or threshold determined for the center subcarrier can then be used for all subcarriers in the group.

While single-bit feedback approaches to updating beamforming and power control have been described above, any suitable number of bits for feedback can be used in accordance with some embodiments. For example, in a two bit approach, rather that generating odd and even weighting vectors, four weighting vectors, labeled 1 through 4, can be generated. These weighting vectors can then each be applied to information symbols across every four intervals. As another example, rather than using two energy levels and one threshold, three energy levels and two thresholds, four energy levels and three thresholds, etc., can be used. Obviously, any other suitable approach can be used.

As described above, beamforming and power control can be used separately or together to improve the performance of wireless digital communication systems, such as MIMO (or more particularly, MIMO-OFDM) systems. Because these techniques can increase processing requirements at a transmitter and receiver, and thus increase power usage and decrease battery life of portable devices, in some embodiments the usage of the techniques can be controlled automatically or manually. In an automatic approach, a mobile terminal can automatically determine if it is in a dynamic environment by monitoring whether the channel estimate for a subcarrier changes or by detecting whether the mobile terminal is moving (e.g., based on an attached GPS device). In a manual approach, a mobile terminal can receive a setting from a user selecting whether the device is moving or not, or specifically selecting whether beamforming and/or power control are to be used, and if so at what frequency the beamforming and power control are to be updated. When selections are based on movement (e.g., whether detected automatically or in response to user input), any suitable selection of beamforming and/or power control can automatically be configured. For example, if a mobile terminal is determined to be moving, beamforming can be selected to be active, while power control can be selected to be disabled in order to decrease power demands and increase battery life of the mobile terminal.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for controlling transmit-power between a wireless transmitter and a wireless receiver, comprising:
    calculating a threshold associated with a subcarrier between the transmitter and the receiver;
    receiving the subcarrier containing an information symbol at the receiver from the transmitter;
    determining a channel estimate of the subcarrier and a weighting vector for the information symbol;
    based at least on the channel estimate and the weighting vector, determining a power level of the subcarrier;
    comparing the power level to the threshold;
    generating a feedback signal to the transmitter indicating a first energy level to be used for the subcarrier based on the comparison of the power level to the threshold;
    subsequent to generating the feedback signal, determining a second power level of the subcarrier based at least on the channel estimate and the weighting vector;
    comparing the second power level to the threshold; and
    generating a second feedback signal to the transmitter indicating a second energy level to be used for the subcarrier based on the comparison of the second power level to the threshold.

2. The method of claim 1, wherein the subcarrier is a multiple-input and multiple-output (MIMO) signal.

3. The method of claim 1, wherein the subcarrier is a multiple-input and multiple-output Orthogonal Frequency Division Multiplexing (MIMO-OFDM) signal.

4. The method of claim 1, wherein the channel estimate is determined from one or more pilot symbols.

5. The method of claim 1, further comprising calculating the first energy level and the second energy level at the receiver based on a time-based energy constraint.

6. The method of claim 1, wherein the feedback signal is a single bit.

7. The method of claim 1, further comprising:
    determining a perturbation vector;
    determining a plurality of weighting vectors to be applied to the subcarrier based on a base weighting vector and the perturbation vector;
    generating a third feedback signal based on at least one of the plurality of weighting vectors; and
    transmitting the third feedback signal to the transmitter.

8. A system for controlling transmit-power from a wireless transmitter, comprising:
    a receiver comprising:
    at least one antenna that receives a subcarrier containing an information symbol from the transmitter; and
    at least one hardware processor that:
        calculates a threshold associated with the subcarrier between the transmitter and the receiver;
        determines a channel estimate of the subcarrier and a weighting vector for the information symbol;
        based at least on the channel estimate and the weighting vector, determines a power level of the subcarrier;

compares the power level to the threshold;

generates a feedback signal to the transmitter indicating a first energy level to be used for the subcarrier based on the comparison of the power level to the threshold;

subsequent to generating the feedback signal, determines a second power level of the subcarrier based at least on the channel estimate and the weighting vector;

compares the second power level to the threshold; and generates a second feedback signal to the transmitter indicating a second energy level to be used for the subcarrier based on the comparison of the second power level to the threshold.

9. The system of claim 8, wherein the subcarrier is a multiple-input and multiple-output (MIMO) signal.

10. The system of claim 8, wherein the subcarrier is a multiple-input and multiple-output Orthagonal Frequency Division Multiplexing (MIMO-OFDM) signal.

11. The system of claim 8, wherein the channel estimate is determined from one or more pilot symbols.

12. The system of claim 8, wherein the at least one hardware processor also calculates the first energy level and the second energy level at the receiver based on a time-based energy constraint.

13. The system of claim 8, wherein the feedback signal is a single bit.

14. The system of claim 8, wherein the at least one hardware processor also:

determines a perturbation vector;

determines a plurality of weighting vectors to be applied to the subcarrier based on a base weighting vector and the perturbation vector;

generates a third feedback signal based on at least one of the plurality of weighting vectors; and transmits the third feedback signal to the transmitter.

15. A system for controlling transmit-power from a wireless transmitter, comprising:

means for calculating a threshold associated with a subcarrier from the transmitter;

means for receiving the subcarrier containing an information symbol from the transmitter;

means for determining a channel estimate of the subcarrier and a weighting vector for the information symbol;

means for determining, a power level of the subcarrier based at least on the channel estimate and the weighting vector;

means for comparing the power level to the threshold;

means for generating a feedback signal to the transmitter indicating a first energy level to be used for the subcarrier based on the comparison of the power level to the threshold;

means for determining, a second power level of the subcarrier based at least on the channel estimate and the weighting vector subsequent to generating the feedback signal;

means for comparing the second power level to the threshold; and means for generating a second feedback signal to the transmitter indicating a second energy level to be used for the subcarrier based on the comparison of the second power level to the threshold.

16. The system of claim 15, wherein the subcarrier is a multiple-input and multiple-output (MIMO) signal.

17. The system of claim 15, wherein the subcarrier is a multiple-input and multiple-output Orthogonal Frequency Division Multiplexing (MIMO-OFDM) signal.

18. The system of claim 15, wherein the channel estimate is determined from one or more pilot symbols.

19. The system of claim 15, further comprising means for calculating, the first energy level and the second energy level at the receiver based on a time-based energy constraint.

20. The system of claim 15, wherein the feedback signal is a single bit.

21. The system of claim 15, further comprising:

means for determining a perturbation vector;

means for determining a plurality of weighting vectors to be applied to the subcarrier based on a base weighting vector and the perturbation vector;

means for generating a third feedback signal based on at least one of the plurality of weighting vectors; and means for transmitting the third feedback signal to the transmitter.

* * * * *

UNITED STATES PATENT AND TRADEMARK OFFICE
CERTIFICATE OF CORRECTION

PATENT NO.       : 8,537,922 B2
APPLICATION NO.  : 12/665684
DATED            : September 17, 2013
INVENTOR(S)      : Xiaodong Wang et al.

It is certified that error appears in the above-identified patent and that said Letters Patent is hereby corrected as shown below:

In the Claims:

Col. 18, Line 29, Claim 19, "calculating, the" should be -- calculating the --.

Signed and Sealed this
Fifth Day of November, 2013

Teresa Stanek Rea
*Deputy Director of the United States Patent and Trademark Office*